(12) United States Patent
Slagmolen et al.

(10) Patent No.: US 12,491,027 B2
(45) Date of Patent: Dec. 9, 2025

(54) AUGMENTED REALITY ASSISTED JOINT ARTHROPLASTY

(71) Applicant: Materialise N.V., Leuven (BE)

(72) Inventors: Pieter Slagmolen, Leuven (BE); Katrien Plessers, Leuven (BE); Filip Jonkergouw, Leuven (BE); Anneleen Van Assche, Leuven (BE); Rosalien Marien, Leuven (BE); Durva Gajjar, Leuven (BE); Chloé Dela Ruelle, Leuven (BE); Nele Daemen, Leuven (BE); Roel Wirix-Speetjens, Leuven (BE); Brecht Heyde, Leuven (BE); Sanne Willekens, Leuven (BE); Ben Geebelen, Leuven (BE)

(73) Assignee: Materialise N.V., Leuven (BE)

( * ) Notice: Subject to any disclaimer, the term of this patent is extended or adjusted under 35 U.S.C. 154(b) by 902 days.

(21) Appl. No.: 17/647,164

(22) Filed: Jan. 5, 2022

(65) Prior Publication Data
US 2022/0125519 A1 Apr. 28, 2022

Related U.S. Application Data

(63) Continuation of application No. PCT/US2020/041381, filed on Jul. 9, 2020.
(Continued)

(51) Int. Cl.
*A61B 34/10* (2016.01)
*A61B 34/20* (2016.01)
(Continued)

(52) U.S. Cl.
CPC .............. *A61B 34/10* (2016.02); *A61B 34/20* (2016.02); *A61B 90/36* (2016.02); *A61B 90/39* (2016.02);
(Continued)

(58) Field of Classification Search
CPC .............. A61B 34/10; A61B 2034/102; A61B 2034/105; A61B 2034/107; A61B 34/20;
(Continued)

(56) References Cited

U.S. PATENT DOCUMENTS

| 8,314,815 B2 * | 11/2012 | Navab | A61B 90/36 |
| | | | 600/407 |
| 9,861,446 B2 * | 1/2018 | Lang | A61B 90/37 |
| 11,376,078 B2 | 7/2022 | Abe et al. | |

FOREIGN PATENT DOCUMENTS

| JP | 2015-531661 A | 11/2015 |
| WO | 2017/156110 A1 | 9/2017 |

(Continued)

OTHER PUBLICATIONS

Japanese Patent Office, Office Action, Japanese Patent Application No. 2022-501342, mailed Jan. 23, 2024.

*Primary Examiner* — Larry E Waggle, Jr.
(74) *Attorney, Agent, or Firm* — Dinsmore & Shohl LLP

(57) ABSTRACT

Systems and methods of providing augmented reality assisted surgery are disclosed. Certain aspects provide a method including generating a virtual scene comprising one or more virtual elements comprising one or more anatomical elements corresponding to one or more anatomy parts. The method further includes identifying one or more references in an actual physical scene comprising the one or more anatomy parts. The method further includes registering the virtual scene to the one or more references to generate an augmented scene. The method further includes displaying the augmented scene on a display device.

20 Claims, 7 Drawing Sheets

Related U.S. Application Data

(60) Provisional application No. 62/871,832, filed on Jul. 9, 2019, provisional application No. 62/872,117, filed on Jul. 9, 2019.

(51) Int. Cl.
*A61B 90/00* (2016.01)
*A61B 34/00* (2016.01)
*A61B 90/50* (2016.01)

(52) U.S. Cl.
CPC ... *A61B 2034/102* (2016.02); *A61B 2034/105* (2016.02); *A61B 2034/107* (2016.02); *A61B 2034/2055* (2016.02); *A61B 2034/2065* (2016.02); *A61B 2034/2068* (2016.02); *A61B 2034/252* (2016.02); *A61B 2034/254* (2016.02); *A61B 2090/365* (2016.02); *A61B 2090/3916* (2016.02); *A61B 2090/3937* (2016.02); *A61B 2090/502* (2016.02)

(58) Field of Classification Search
CPC .... A61B 2034/2055; A61B 2034/2065; A61B 2034/2068; A61B 2090/365; A61B 2090/3916; A61B 2090/3937
See application file for complete search history.

(56) References Cited

FOREIGN PATENT DOCUMENTS

| WO | 2018078723 A1 | 5/2018 | |
|---|---|---|---|
| WO | 2018/203304 A1 | 11/2018 | |
| WO | WO-2019036752 A1 * | 2/2019 | ............. A61B 34/10 |

* cited by examiner

AUGMENTED REALITY ASSISTED JOINT ARTHROPLASTY

CROSS-REFERENCE TO RELATED APPLICATIONS

This application is a by-pass continuation of International Application No. PCT/US2020/041381, filed Jul. 9, 2020, which claims priority to U.S. Provisional Patent Application No. 62/871,832, filed Jul. 9, 2019 and U.S. Provisional Patent Application No. 62/872,117, filed Jul. 9, 2019. The contents of each of these applications are hereby incorporated by reference in their entirety.

BACKGROUND OF THE INVENTION

Field of the Invention

This application relates to computer assisted surgery.

Description of the Related Technology

Conventional joint reconstruction and replacement surgery, including ankle, knee, shoulder, and/or elbow arthroplasty, is based in large part on standard methods and guidelines for acceptable performance. In this regard, the positioning of the implants into the joint is based on standard values for orientation relative to the biomechanical axes, such as varus/valgus, flexion/extension, and/or range of motion.

Knee arthroplasty (KA) is a common surgical procedure to restore function and eliminate pain in a knee joint that is suffering from osteoarthritis. The correct positioning of implant components (e.g., femoral, tibial, or patellar) may be crucial in achieving good patient outcome. In some cases, component placement in KA is performed through computer assistance.

Shoulder arthroplasty (SA) is a common surgical procedure to restore function and eliminate pain in a shoulder joint that is suffering from osteoarthritis or that has fractured due to trauma. The correct positioning of implant components (e.g., humeral, glenoid) may be crucial in achieving good patient outcome. Good patient outcome may mean to remove pain, restore range-of-motion, and/or avoid revisions. Accordingly, the surgeon may avoid impingement, fractures, and/or dislocations due to inappropriate implant stresses while ensuring proper fixation with decent implant coverage and proper screw positioning.

A computer-assisted surgical navigation system conventionally requires a time-consuming setup and registration of the patient's anatomy with either a pre-operative scan or with a parameterized three-dimensional model that is constructed from reference points obtained from the patient's anatomy. This virtual surgical plan may conventionally be translated to the patient via intra-operative guidance techniques such as computer navigation, patient-specific guides or robotics using computer assistance. These systems are time consuming, and require bulky setups and partly manual operation. This makes the setup less user friendly. Further, since the pre-operative plans and medical images are displayed on external display monitors they are in a different location, with a different coordinate system making hand-eye coordination for the surgeon challenging.

Further, such prior conventional computer-assisted navigation systems have not assisted the surgeon by providing step-by-step procedures to guide the surgeon in making the proper balance between bone cuts, implant size, and soft tissue constraints or balancing. As such, the surgeon has to perform necessary additional steps without corresponding additional benefits which also affects the procedure and the outcome of the surgery.

A further drawback of many conventional computer-assisted surgical navigation systems is a lack of user friendliness. Many such systems come with bulky or cumbersome hardware, which occupies valuable space in the operating room and causes line-of-sight issues for the surgical staff.

SUMMARY

Certain embodiments provide a method of providing augmented reality assisted surgery. The method includes generating a virtual scene comprising one or more virtual elements comprising one or more anatomical elements corresponding to one or more anatomy parts. The method further includes identifying one or more references in an actual physical scene comprising the one or more anatomy parts. The method further includes registering the virtual scene to the one or more references to generate an augmented scene. The method further includes displaying the augmented scene on a display device.

Certain embodiments provide a non-transitory computer-readable medium having computer-executable instructions stored thereon, which, when executed by a processor of a computing device, cause the computing device to perform the described method.

Certain embodiments provide a computing device comprising a memory and a processor configured to perform the described method.

DETAILED DESCRIPTION OF CERTAIN INVENTIVE EMBODIMENTS

Figure 1:
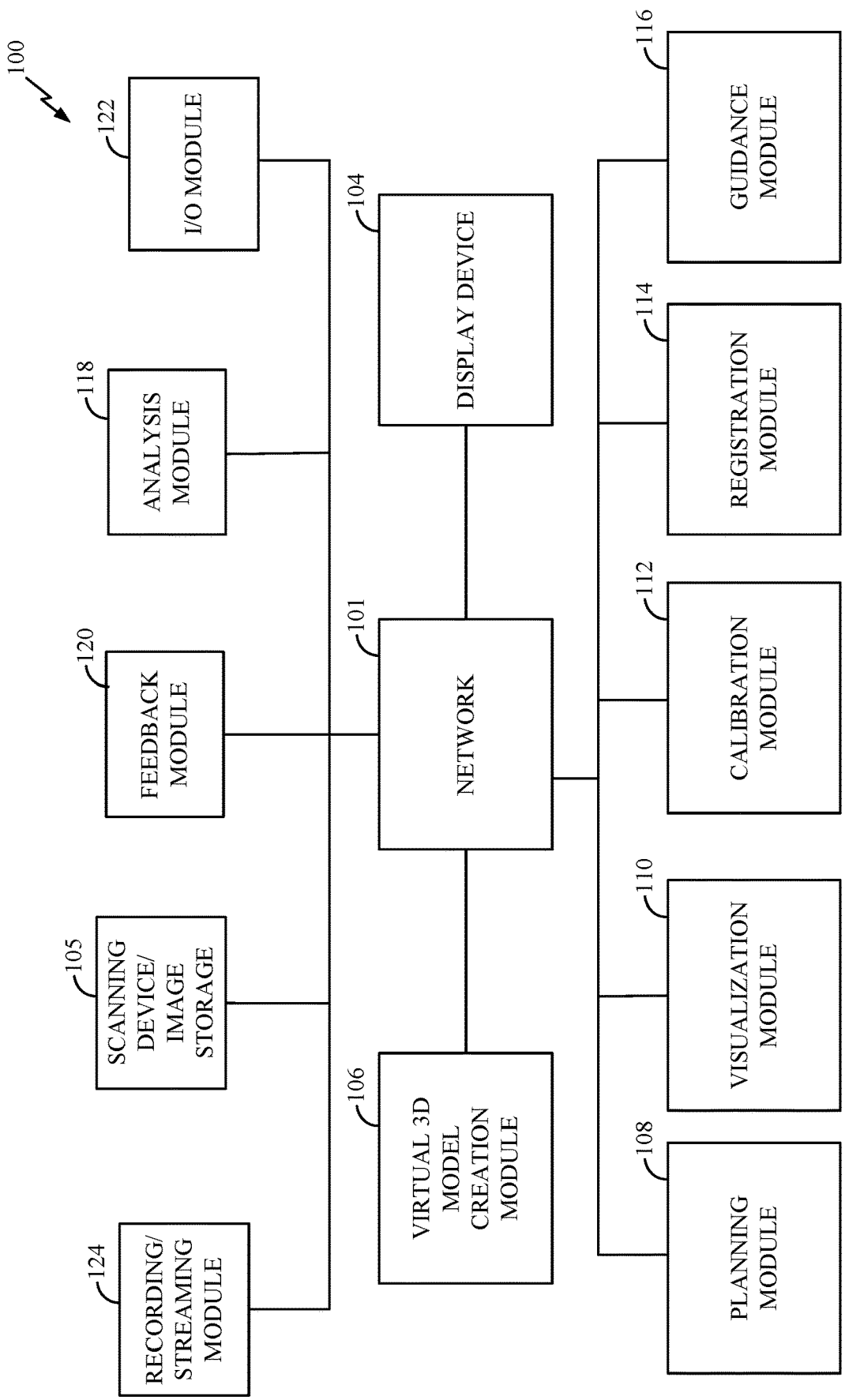
FIG. 1 is a block diagram of one example of an augmented reality (AR) system as a computing environment suitable for implementing an augmented reality system in accordance with one or more embodiments disclosed herein.
Figure 2:
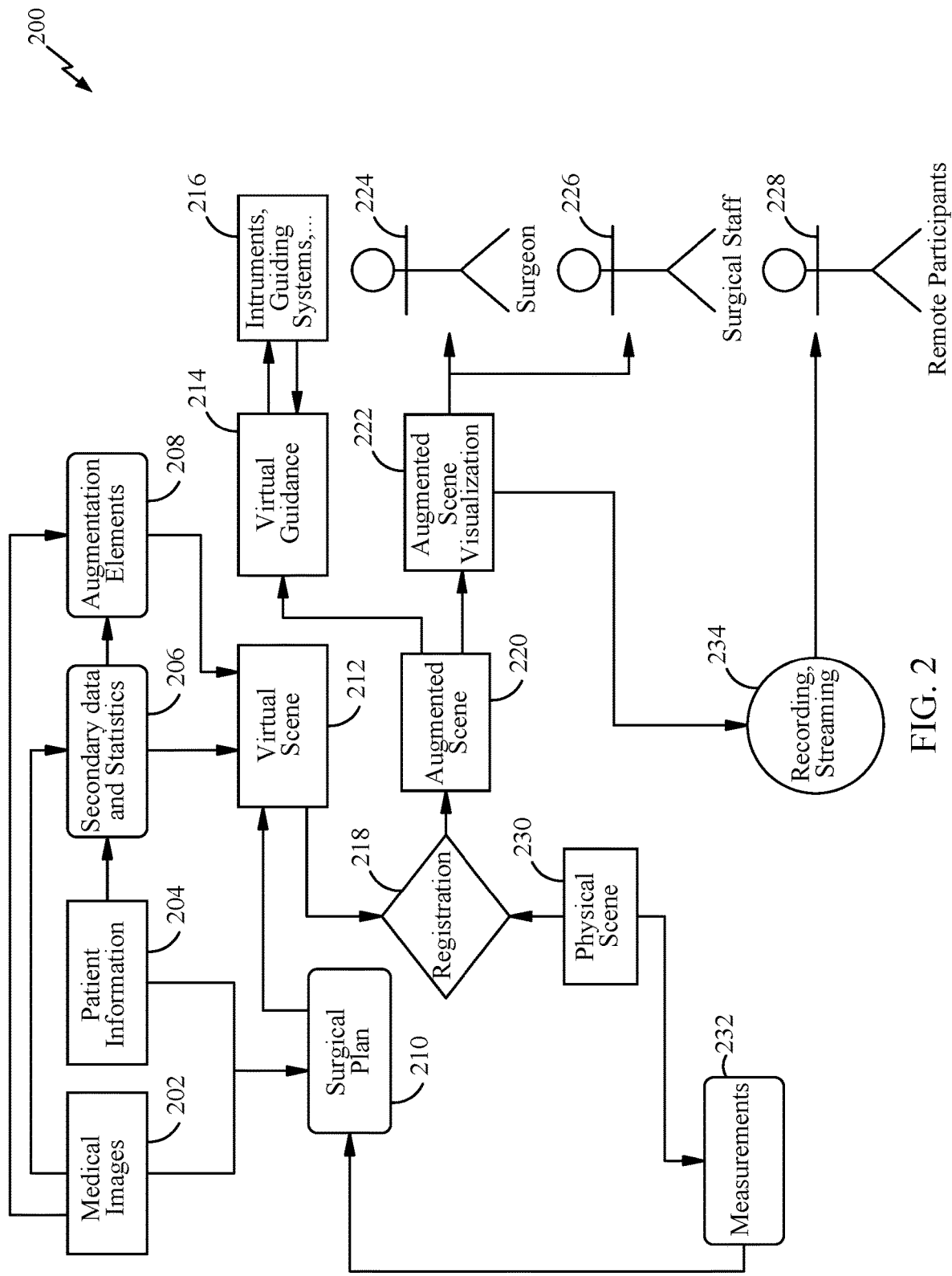
FIG. 2 is a high level workflow diagram for an augmented reality system in accordance with one or more embodiments.

With computer assisted surgery, e.g. surgical navigation or robotics, pre-operative imaging studies of the patient or medical images captured intra-operatively can be used. The images can be displayed in the operating room (OR) on an external computer monitor and the patient's anatomy, e.g. landmarks, can be registered in relationship to the information displayed on the monitor. Since the surgical window is in a different location and has a different view coordinate system for the surgeon's eyes than the external computer monitor, hand-eye coordination can be challenging for the surgeon.

Accordingly, certain aspects of the disclosure provide novel systems and methods for using mixed-reality (e.g., augmented (AR)), to allow the translation of the virtual surgical plan to the operating room (OR) by blending the surgical scene with a virtual environment ('augmented environment'), and using a display device/unit, such as a portable device or a headset, to visualize this blended environment, thereby assisting the surgeon during surgery. Some of the advantages associated with the use of an interactive system in the OR include reducing the time spent in the OR, an overall satisfactory surgeon and/or patient experience, the adaptability of the system allowing the surgeon to deal with any complications encountered in the OR in an informed and efficient manner in real time, etc.

Unlike conventional methods, the systems and methods described herein provide improved ability for the surgeon and patient to plan, visualize, and evaluate surgical procedures resulting in improved patient outcomes. Further, the systems and method provide improved accuracy in surgical procedures as compared to traditional systems, again improving patient outcomes and the field of medicine.

An example AR system includes: intra-operative imaging and/or sensors and/or markers, instruments, cameras (to track patient anatomy, surgeon location, various devices and instruments, etc.), computer devices, and at least one display unit, such as a head-mounted display glasses, portable electronic devices, projection unit and/or overhead display monitors, to relay the relevant information as an augmented environment. For example, the imaging, sensors, markers and cameras may correspond to I/O module 122 of FIG. 1. Further, the computer devices may run the various modules described with respect to FIG. 1. Further, display unit may correspond to the display device 104 of FIG. 1.

When blending an actual scene—i.e. reality—with a virtual environment, the AR system displays to the user a combined view of the actual scene and the virtual environment. This means that parts of the user's field of view may be occupied by a view of the actual scene, other parts may be occupied by renderings of elements from the virtual environment, and yet other parts may be occupied by a blend of both (e.g. virtual elements overlaid semi-transparently onto a view of the actual scene).

AR systems typically comprise at least one camera. This camera may be embedded in the device that also comprises the display (handheld device, headmounted display), but may also be external to the display system (e.g. a wireless or wired camera attached to the surgical theater). Multiple camera systems may be used to circumvent line-of-sight issues or to address potential distortion between one of the camera's and the scene (e.g. when wearing a surgical mask over a head-mounted device). The data coming from multiple cameras may be used independently or may be combined wherever possible.

In order to display such a combination of the actual scene and a virtual environment, an AR system comprises at least one display unit. Examples can include head-mounted display glasses, portable devices, and/or fixed devices, which either display or project elements of the virtual environment on an otherwise transparent lens or other objects in the scene, or comprise one or more cameras to record the actual scene and then display the blended scene on a monitor.

To be able to meaningfully combine the actual scene and the virtual environment in one image, AR systems typically need to bring both into a common coordinate system. One possibility is to register the virtual environment to the actual scene, such that both share a coordinate system, i.e. the world coordinate system. Different systems and methods are known in the art to perform this registration.

The AR system then needs to determine the display unit's view point and viewing direction, i.e. the display unit's coordinate system. Different systems and methods are known in the art to achieve this. For example, cameras in fixed positions or cameras/sensors embedded in the display unit may be used to track the movement of the display unit and deduce from this movement the display unit's coordinate system in relation to (parts of) the environment (e.g. SLAM).

To blend an element of the virtual environment into a view of the actual scene, the AR system may align a virtual camera with the display unit's coordinate system, create a rendering of the virtual element using the virtual camera, and combine the rendered image with the view of the actual scene in the display unit.

In some systems, the motion of a particular object may be tracked, such as an instrument, pointer, a (part of) an imaging system, an implant, an implant component, the patient, or an anatomical part of the patient, the surgical staff, or an anatomical part of someone in the surgical staff, through the actual scene, or to attach the world coordinate system to such an object. A common way of doing this, is to optically track the movement of one or multiple clearly identifiable markers rigidly attached to the object with one or more cameras or sensors either at fixed positions in the actual scene or incorporated into the display unit. Alternative ways may include creating a digital model of the objects themselves (e.g. object tracking) or using stochastic methods (e.g. for hand tracking) to track these objects. Yet other methods may use alternative sensor systems such as medical imaging, radio-wave based positioning (RFID, UWB), etc.

Embodiments of systems and methods described herein provide visual guidance/assistance during surgical procedures using AR technology.

In some embodiments, the systems and methods provide visual guidance/assistance to user(s) using an optical head-mounted display (OHMD) and/or overhead display. In some embodiments, the system uses a mobile or wearable device (e.g., smartphone, tablet, etc.) to provide such guidance.

According to an embodiment, the systems and methods provide visual guidance/assistance during knee and shoulder arthroplasty surgery.

Although certain aspects of the description that follows describe embodiments of systems and methods being used for knee and shoulder replacement surgery, the systems and methods can similarly be used to replace or repair any unconstrained joint, such as the ankle, hip, and/or the elbow. Parts of the system may also be used in non-arthroplasty surgeries or interventions, e.g. during cranio-maxillofacial surgery or cardiac valve interventions.

Virtual surgical planning is performed either pre-operatively or intra-operatively. This virtual surgical plan is translated to the patient via intra-operative guidance techniques such as computer navigation, patient-specific guides, patient-specific 3D models or robotics.

Figure 6:
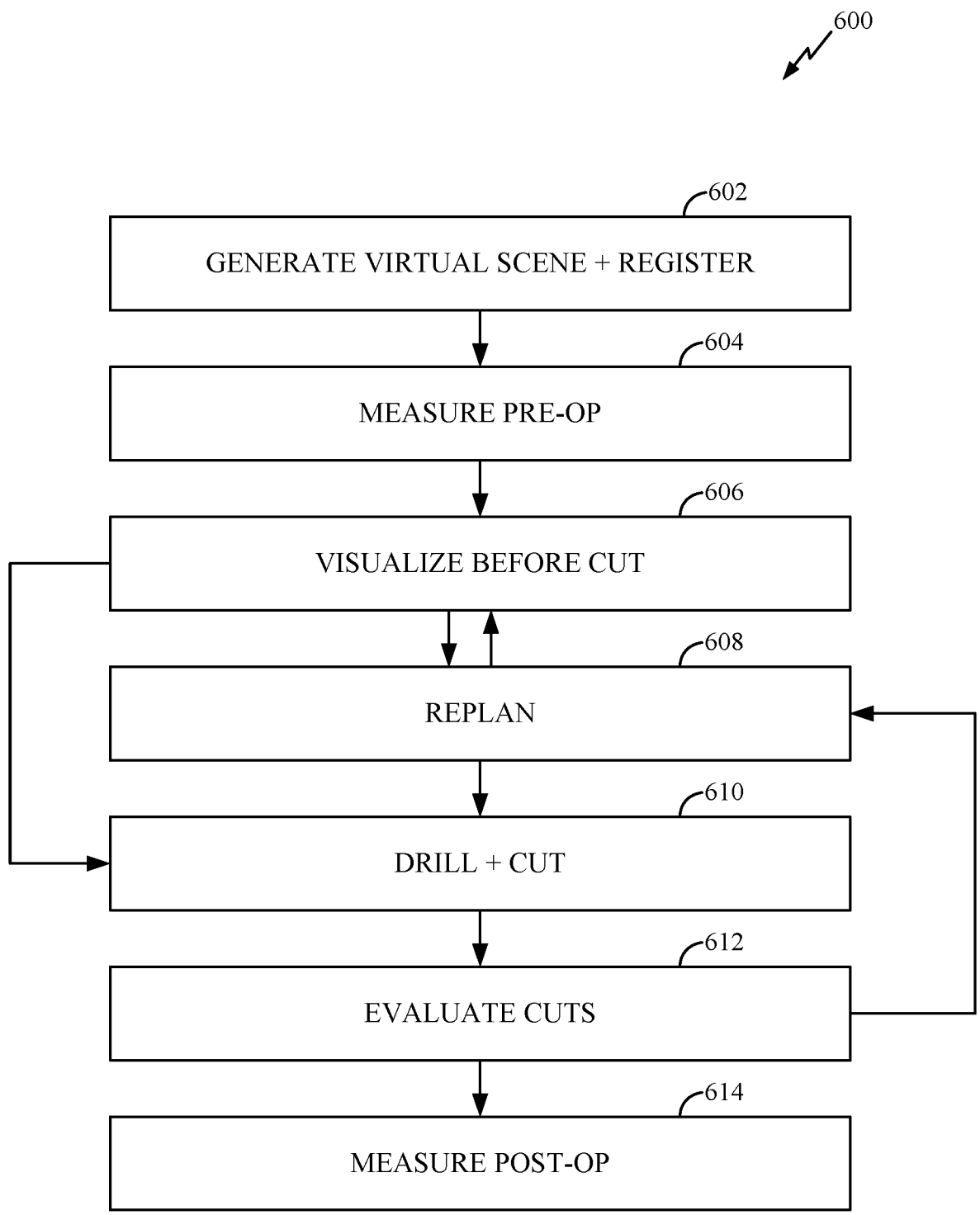
FIG. 6 illustrates a flow chart showing a process for operating an augmented reality system, according to certain embodiments.

During planning, the surgeon mentally prepares for the surgery. The steps comprise one or more of: gathering patient data, analyzing the anatomy to determine the defects, predicting soft-tissue balance and range-of-motion after surgery based on the defects and the post-op range of motion, determining the procedure to follow (e.g. TKA, PKA, SA, rSA), preselecting the instruments (e.g. implant size, stem), determining the position of the implant and fixation elements such as screws (e.g., orientation, depth, location), and the associated reaming depth or osteotomy location, amongst other critical surgical parameters. These steps can be performed for any joint component of the implant. During surgery, the aim is to transfer this plan as accurately as possible. The workflow for augmented reality enhanced joint surgery according to certain embodiments is shown in FIG. 6.

Patient data may comprise one or more of medical images, personal information, such as age, sex, weight, height, ethnicity, lifestyle, activity level, medical history, any data gathered during pre-surgical exams, such as complaints, pain scores, gait measurements, range-of-motion measurements, degenerative or congenital defects, sports or age-related injuries, any data gathered intra-operatively, such as anatomical or functional measurements, and others.

Data may be entered into the system either manually or automatically, through any devices used during surgery, such as navigation systems, robotics systems or AR systems, or through an electronic access device.

The systems and methods described herein may be implemented in a computing environment comprising one or more computing devices configured to provide various functionalities. FIG. 1 is an example of a computer environment 100 suitable for implementing certain embodiments described herein. The computer environment 100 may include a network 101. The network 101 may take various forms. For example, the network 101 may be a local area network installed at a surgical site. In some embodiments, the network 101 may be a wide area network such as the Internet. In some embodiments, the network 101 may include a bus on a device itself. In other embodiments, the network 101 may be a combination of local area networks, wide area networks, and local buses. Typically, the network will allow for secured communications and data to be shared between various computing devices/components/modules. Each computing device may be a typical personal computer device that runs an off-the-shelf operating systems such as Windows, Mac OS, Linux, Chrome OS, or some other operating system. Each computing device may have application software installed to allow it to interact via the network 101 with other software stored on various other modules and devices in the computing environment 100. This application software may take the form of a web browser capable of accessing a remote application service. Alternatively, the application software may be a client application installed in the operating system of the computing device. Each computing device may also take the form of a specialized computer, specifically designed for medical surgical imaging and planning, or even more specifically for augmented reality. Each computing device may further take the form of a mobile device or tablet computer configured to communicate via the network 101 and further configured to run one or more software modules to allow a user to perform various methods described herein.

As shown are a number of modules and devices coupled to network 101. Each of these modules/devices may be separate as shown and correspond to different computing devices (e.g., comprising a memory and a processor configured to execute the functions of the module). In certain aspects, the modules may be application that runs on a computing device. Though the devices and modules are shown as separate and communicating via network 101, different modules and devices may run on a same computing device, in any suitable combination of any suitable number of computing devices.

The computing environment 100 includes a display device 104. The display device 104 may include one or more of an optical head-mounted display (OHMD), monitor, TV, and/or overhead display, etc., used to display a virtual environment as part of a real environment. In certain aspects, such as where the display device 104 is a head-mounted display, the display device includes one or more accelerometers, cameras, positioning systems, etc., that track a position, orientation, etc., of the display device 104.

The computing environment 100 further includes a scanning device/image storage 105. In certain aspects, the scanning device/image storage 105 includes a large database designed to store image files captured by scanning device/image storage 105. These images may be DICOM images, or other types of images. The scanning device/image storage 105 may also be in a standalone database, for example in a server-based system, such as a PACS system, having dedicated storage optimized for medical image data. The scanning device/image storage 105 may alternatively or additionally comprise a medical imaging device which scans a patient to create images of their anatomy. In the computing environment 100 shown in FIG. 1, the scanning device/image storage 105 may be a CT scanner, ultrasound device, or an MRI device. However, a skilled artisan will appreciate that other scanning technologies may be implemented which provide imaging data that can be used to create three-dimensional anatomical models.

The computing environment 100 may also include a virtual 3D model creation module 106. The virtual 3D model creation module 106 may take the form of computer software, hardware, or a combination of both which retrieves the medical imaging data from scanning device/image storage 105 and generates a three-dimensional model, such as by using stacks of 2-D image data. The virtual 3D model creation module 106 may be a commercially available image processing software for three-dimensional design and modeling such as the Mimics application from Materialise NV. However, other image processing software may be used. In some embodiments, the virtual 3D model creation module 106 may be provided via a web-based network application that is accessed by a computer over the network. Alternatively, the virtual 3D model creation module 106 may be a software application that is installed directly on a computing device, and accesses scanning device/image storage 105 via the network 101. In general, the virtual 3D model creation module 106 may be any combination of software and/or hardware located within the computing environment 100 which provides image processing capabilities on the image data stored within the scanning device/image storage 105.

In certain embodiments, patient data may be loaded into the virtual 3D model creation module 106 from a file, a storage medium, cloud database or entered manually into the virtual 3D model creation module 106 in the OR.

Input data comprising of patient information 204 is processed to construct a surgical plan. For example, as shown in workflow 200, medical images 202 and patient information 204 is used to generate a surgical plan 210.

For example, medical images 202, such as CT, MRI, or ultrasound images, from scanning device/image storage 105 may be converted through segmentation by virtual 3D model creation module 106 into one or more virtual 3D models of one or more anatomy parts, such as bony anatomy, cartilage, organs, organ walls, vasculature, nerves, muscles, tendons and ligaments, blood pool volume, etc. Additionally or alternatively, virtual 3D models may be obtained by virtual 3D model creation module 106 reconstructing a 3D shape based on a 2D image (e.g. X-ray, ultrasound) from scanning device/image storage 105, using prior population knowledge (e.g. by using Statistical Shape Models) or by directly measuring on the patient's exposed anatomy using marking and/or motion tracking devices, such as provided by I/O module 122 (e.g., which may be coupled to cameras, motion tracking devices, etc.) or surface scanning methods provided by scanning device/image storage 105. The virtual models may be iteratively improved by virtual 3D model creation module 106 and presented on display device 104 to the user as more information becomes available, e.g. while performing measurements intra-operatively.

Anatomical landmarks may be determined manually by indicating them on the medical images or on the virtual 3D models using I/O module 122, automatically by analysis module 118 using feature-recognition techniques or by fitting statistical models that comprise information on the anatomical landmarks on the medical images or on the virtual 3D models, by intra-operative annotation of the landmarks or using motion tracking based reconstruction to derive such landmarks (e.g. the hip center). Anatomical coordinate systems, anatomical axes and/or mechanical axes may be derived from the anatomical landmarks by analysis module 118.

The computing environment 100 may also include a planning module 108. The planning module 108 may be configured to perform surgical planning for an AR system. This may be done pre-operatively or intra-operatively. In both cases, anatomical landmarks, any derived coordinate systems and/or axes, and/or 3D anatomical shapes may be used by planning module 108 to determine (e.g., the most) suitable implant components, their sizes and their positions (e.g. locations and orientations) in relation to said anatomical landmarks. The plan 210 may be updated by planning module 108 during surgery when additional information (such as complications that could not be predicted pre-operatively) becomes available (cf. FIG. 6 for a workflow). During planning, the surgeon may choose the landmarks that he wishes to be highlighted and overlaid on the patient during surgery.

Embodiments of planning module 108 of AR systems herein may allow both pre-operative and intra-operative planning. Intra-operatively, the user may use the planning module 108 to plan the surgery before the patient is opened or after the patient has been opened to reveal the surgical site.

In certain instances, the user may use the planning module 108 to plan the surgery on an anatomical 3D patient-specific model such as a 3D printed patient-specific model.

In certain instances, the surgical plan 210 may be created or adapted fully automatically by planning module 108 and without any user interaction, e.g. based on predictive algorithms or based on pre-defined rules. In certain instances, the surgical plan 210 may need to be created or adapted during surgery. The surgeon may plan the surgery before or after opening the patient.

In certain instances, the surgical plan 210 may need to be created or adapted during surgery by planning module 108. Embodiments of planning module 108 of AR systems herein may be used to modify the surgical plan 210 in an informed and efficient way. The planning module 108 of an AR system may require a plan to be transferred from another location (cloud, other workstation, different software, such as over network 101). This may be performed directly through a network link between the different systems. Alternatively, visual references may be used (e.g. QR codes) that either encode the planning information directly in them or encode a link that allows to transfer the information from said alternative location. Optical elements in the AR system, such as in display device 104 (e.g. the camera in a headmounted device), may be used to capture and analysis module 118 may decode the visual references.

In certain embodiments, it is possible to perform intra-operative surgical planning without the need for pre-surgical planning or image acquisition. For example, in some embodiments, to plan the proximal cut on the tibia, the I/O module 122 and/or display device 104 may ask the user to manually indicate the malleoli, for example by using a stylus that is tracked by the system, and one or both intracondylar tubercles of the tibia. From these landmarks, the planning module 108 and/or analysis module 118 can then derive the anatomical axis of the tibia without the need for using an intra- or extra-medullary rod. In some embodiments, to plan the cuts on the distal femur, the I/O module 122 and/or display device 104 may ask the user to manually indicate the epicondyles and/or the most distal point of the intercondylar fossa. The I/O module 122 and/or display device 104 may also ask the user to move the patient's leg. By tracking that movement, the I/O module 122, planning module 108, and/or analysis module 118, may be able to determine the hip center of rotation. From this center of rotation and the manually indicated landmarks, the planning module 108 and/or analysis module 118 may then determine the mechanical axis of the femur without the need for using an intra-medullary rod. Other landmarks can be used for such procedures.

In certain embodiments, it may be possible to adapt a surgical plan or plan interactively based on intra-operative information. This may include clinical judgement by the surgeon or may involve more elaborate objective analysis methods, data measured using the AR system itself (such as anatomical landmarks or motion) or data integrated from external systems such as force/stress/strain sensors or robotic systems. The plan 210 may also be updated based on secondary data which is derived from measurements 232, for example by estimation of the joint stability through musculoskeletal modeling based on the primary measurements. Another example is to assess isometric behavior of ligaments based on primary strain/stress/force measurements Yet another example is to use intra-operative balancing measurements (e.g., ligament strain, compartmental pressure, etc.) to determine a patient's constitutional alignment, thereby allowing to correct the plan to achieve a more patient-specific alignment.

Adapting or creating the plan intra-operatively may be performed by directly controlling clinical parameters (such as implant type and size, inclination, version, implant rotation or central reaming depth), using any of the below mentioned interaction methods. The plan adaptation may be performed indirectly through a cloud service, which may run in a virtual window in the augmented environment and will update the augmentation elements in a second stage or may be done directly on the augmentation elements as described below.

The planning module 108 can also suggest multiple options for correcting a joint that would appear to be too tight after balancing. This may include the method and amount of ligaments releases, including the ligament to release. This may also include the necessary bony recuts, either on tibia or femur, and the amount of bone to be removed to create a stable joint.

The AR system may enable the user to make informed decisions based on bony and soft tissue data by presenting on display device 104 such data using visualization module 110 in an interactive format. During intra-operative planning, all the relevant information may be overlaid on the patient, patient-specific anatomical 3D model or on one or more display monitors using display device 104. To guide and/or assist the surgeon in making informed decisions, the planning module 108 and/or visualization module 110 may highlight relevant information and communicate it to the surgeon using one of many visualization methods, some of which are elaborated below, subject to surgeon preference.

The augmented environment provided by certain embodiments herein may thus comprise different components such as one or more of: various augmentation elements, virtual guidance tools, visualization methods comprising display components, etc. One or more combinations are possible, subject to user preference. One or more augmented environments may be created or used by the system, depending on the number of users using the system. This makes the system customizable and user friendly such that multiple users can use the system at the same time and only deal with information that is individually relevant for them.

The computing environment 100 further includes a visualization module 110. In certain embodiments, the visualization module 110 is configured to perform visualization methods comprising one or more of overlaying patient information, providing step-by-step guidance during the procedure, indicating the relevant anatomical landmarks, instruments, devices, best practices, etc. for executing the surgery.

During surgery, an augmented environment/scene 220 is created by visualization module 110 that may be wholly or partly visualized to the surgeon 224, his staff 226 and/or remote participants 228 such as through one or more display devices 104 though visualization 222 of the augmented scene. This augmented environment 220 contains information that will guide/assist the surgeon during the procedure.

The actual/physical scene 230—i.e. reality—may be augmented by visualization module 110 with visualizations of virtual/augmentation elements 208 that are displayed on the patient, e.g. with an overlay on the anatomy, that may be partially transparent or fully opaque. In this way, anatomy may be highlighted, obscured, annotated, augmented, etc.

To allow the surgeon to focus on the area of interest, one or more of the obstructed objects such as hands, tools, implants, etc. may be hidden/made transparent, e.g. by using additional camera streams or historical camera data from I/O module 122 to replace the obscured part of the scene using augmented elements 208.

In some embodiments, the actual scene 230 may be augmented with visualization of virtual elements 208 forming a virtual scene 212 that are spatially attached to the patient and his position (or the position of individual anatomical parts or landmarks of the patient) but don't necessarily overlap with the actual anatomy. This may include one or more of derived landmarks, annotations, lines, planes, zones, dynamic information, target positions for guidance, etc., such as based on secondary data and statistics 206.

The actual scene 230 may also be augmented with visualization of virtual elements 208 on top and/or spatially attached to physical objects other than the patient in the operating room (OR). This may include one or more of instrumentation, tools, implant components, navigation systems, robotic elements, etc.

The actual scene 230 may also be augmented with visualization of virtual elements 208 around the patient, either in the field-of-view of the surgeon and/or on dedicated virtual places in the real OR, where these virtual places may vary based on a number of factors. These factors may depend on the surgeon, the surgical step and/or the information to be transferred by the surgeon and/or his staff using some form of input to the system.

The virtual information that augments the environment may be static, moving along with one or more physical objects in the actual scene, moving independently of the actual scene, or floating freely in the augmented environment and movable by the user, as per surgeon convenience.

The virtual information may be adapted to account for occlusion of those virtual objects by the physical objects. For example, the system may use any known 3D scanning or stereophotogrammetry techniques to determine the three-dimensional shapes and positions of all objects within the user's field of view. Those shapes can then be added to the virtual environment and used to determine which parts of the virtual objects to be displayed are obscured by the objects from the actual scene. Based on this information, the visualization module 110 may omit those parts during rendering or render them differently, e.g. with a different transparence, luminosity, hue or saturation. Alternatively or additionally, the visualization module 110 may add any of the virtual 3D models of anatomical parts obtained from medical images as described above to the virtual environment 212, and use those to determine occlusion. When multiple users are using the system, the above may be tailored to the individual user role, preference or physical position in the actual scene.

In certain embodiments, the visualization may be adapted based on real-time information that is captured during surgery, or through simulations or analysis that are performed based on this real-time information. The virtual information may thus be dependent on elements that are visible in the scene, e.g. the real-time implant position, and be updated accordingly, e.g. by providing automatically calculated optimal screw positions for that specific implant position.

The user may look at the augmented environment 220 via display device 104 such as traditional computer displays, via mobile or portable devices such as smartphones or tablets, via projection-based devices or via head-mounted display systems. In some instances, the display will visualize the augmented environment as a combination of virtual elements 208 and a camera image of the actual scene 230. In other instances, the display will only visualize the virtual elements of virtual scene 212 and project them in the field-of-view of the user as to overlay them on his own perception of the actual scene 230 (see through display). In the latter case, display calibration may be required (next to registration) to ensure that the display system understands how to align the viewing position of the user in relation to the display and create an experience where virtual information can spatially be overlaid correctly on the actual scene.

In certain embodiments, computing environment 100 includes a calibration module 112 configured to perform such display calibration as part of the augmented reality system as it is user dependent and may be repeated if the display 104 is repositioned with respect to the user. Display calibration may also allow to correct for optical artifacts caused by glasses or surgical masks which may sit between user, display and camera system and the environment. It may be performed by asking a user to perform any task where he aligns a physical element (e.g. a tracked marker, a body-part, an object, etc.) to one or multiple virtual elements displayed on the see-through display. To improve performance or user experience, display calibration may be performed interactively, whereby the display calibration is iteratively updated as the user is performing the task. The calibration module 112 may provide additional guidance to the user for performing display calibration, e.g. by using optical tracking to provide feedback on the distance from the user at which the task needs to be performed. Alternatively, display calibration can be performed using eye tracking or gaze tracking or using external camera systems that can spatially relate the positions of the display and the eyes.

Display calibration may be stored based on individual user profiles, so that for recurring sessions, the calibration effort can be eliminated or vastly reduced.

Multiple camera systems of I/O module 122 can be used and can be calibrated together or can be used to calibrate a single display when their relative position is known.

As described above, the AR system needs to align the virtual environment/scene 212 and the actual scene 230 to create the 'augmented environment/scene' 220. This can be achieved through optical or other alignment systems, whereby the actual scene 230 is spatially referenced to the virtual environment 212. For example, in certain embodiments, computing environment 100 includes a registration module 114 to perform such alignment. Registration module 114 may be configured to register 218 a virtual scene 212 including virtual/augmentation elements 208 and/or statistics 206 for display, to actual scene 230, to generate augmented scene 220 which is then visualized 222 and output to display device 104.

Optical systems may use physical markers to perform registration 218 and tracking by registration module 114. These markers may be positioned in a fixed location in the actual scene 230, or be attached to any independently moving objects in the actual scene 230, including the patient, any individually moving anatomical part of the patient (e.g. bones, soft-tissue, limbs, etc.), and objects such as instruments (e.g. drills, saws, bone pins, etc.), anatomical 3D patient-specific models, implants or implant components. The markers may be organized in pre-defined 3D configurations to facilitate optical recognition. Any physical 3D object with a known geometry may directly serve as a physical marker. The marker may be a (3D printed) guide, which is (partially) patient-specific and may be configurable intra-operatively to a certain degree or an anatomical 3D patient-specific model used for registration. Markers may also be included in wearable devices such as eyewear, elastic bands, etc.

Markers may be attached to multiple structures (e.g. the shoulder skin, shoulder blade and glenoid bone surface, surrounding soft tissue, muscles, ligaments, etc.) and indirectly related to the anatomy to be registered by using computational models.

A marking device may also be used (e.g., a tracked pen) via I/O module 122 to register the anatomy of individual bones in the augmented environment. This may include the glenoid surface. The coracoid surface may also be used as a reference point as it is located outside of the surgical window. The shoulder blade may also serve as an indirect marker. The combination of multiple markers, in combination with vision data (e.g., from cameras of I/O module 122), may also be used to capture the anatomy of interest's position.

Optical systems may also operate without markers by directly using the anatomy visible inside the surgical window or adjacent structures (such as soft-tissue or skin) around the surgical window for registration and tracking by registration module 114. Registration module 114 may reference (parts of) the virtual 3D model created by virtual 3D model creation module 106 to data acquired from a camera system by I/O module 122 by using any shape recognition techniques known in the art. The 3D model may be a patient-specific model based on imaging, may be an instance of a parametric model derived from a population (such as a statistical shape model) or may be obtained intra-operatively. Any combination of the above may be used by virtual 3D model creation module 106 to create the 3D model, e.g. using a population based shape model of the knee anatomy with patient-specific information obtained from an X-ray, CT or MRI image and with patient-specific information obtained intra-operatively such as known landmarks. Thereby, the 3D model may be created before surgery (using preoperative imaging) or during surgery (using intra-operative information or a mix of pre-operative and intra-operative information). Such a vision-based system may also directly track the instruments and their position in space, without the need for explicit marker systems.

It is also possible to use additional camera systems (e.g. included in multiple AR devices or with separate camera systems) to hold the scene even if the surgeon takes the glasses off or removes markers or in the case of occlusion.

An incremental registration (or layering) mechanism may also be used by registration module 114 whereby initially the scene is registered to the anatomy (e.g., a marker on the glenoid), in a second stage the scene is registered to an instrument (e.g., a marker on the glenoid pin or the glenoid pin as the marker) and (optionally) in a later stage the scene is registered to an implant component (e.g., a marker on the implant or the implant itself as the marker).

Alternative tracking systems such as infrared markers or radio-wave (RF) tracking may also be used. They may be referenced to the augmented environment through visual systems or through otherwise calibrated electronic systems.

Previous implant components may be detected automatically in revision surgery. These implant components may then be used as registration markers as they are known in relation to the pre-surgical imaging.

Registration and tracking allows the user to perform various measurements 232, as described below.

As the augmented reality system/environment 100 allows to estimate the pose and location of anatomy and instruments, it may be used to make measurements 232 intra-operatively or pre-operatively, such as by analysis module 118. These measurements may influence the planning procedure 210 or allow to display specific information.

One measurement that could be performed involves the parameters of a cut based on a saw blade position. Such parameters could include amount of bone resected (e.g., volume, distance). These parameters could be converted to a clinical parameter, such as version, inclination or reaming depth Using the AR system, the surgical phase may also be detected (e.g., semi-) automatically. This may lead to specific workflow guidance through the surgical procedure, e.g. by showing surgical steps, demonstrating the next step, providing up-to-date instrumentation lists, etc. For example, in certain aspects, computing environment 100 includes a guidance module 116 configured to provide virtual surgical guidance 214. This may include providing guidance 214 during placement of the humeral and glenoid implant, but it may also include aiding in the other steps in the procedure such as shape grafting for bio-RSA or showing placement required reaming.

Another measurement may be to determine the parameters of a drill hole (e.g. drill depth) based on an analysis of the screw, reamer or drill position.

By performing passive or active motion and tracking the anatomical components, an analysis of this motion can be made, e.g. to determine the center-of-rotation of the shoulder joint based on its movement.

Also, anatomical landmarks can be manually annotated using a tracked device or pointer or by visually detecting the landmarks through the camera by I/O module 122. From these anatomical landmarks, secondary measurements can be derived.

Automatic detection of the exposed bone or soft-tissue surface can allow creating of a 3D representation of this anatomy. This may be used for example to detect if the bone shape still corresponds to the original image data (e.g. to check that a recent scan was used) or to identify if soft-tissue changes have occurred that may influence the outcome (e.g. weight loss).

Another measurement may be the range-of-motion, pre-operatively as well as intra-operatively.

During range-of-motion assessment, the surgeon is moving the arm. Using intra-operative measurement tools (such as sensors), more objective assessment of the range-of-motion may be achieved. Alternatively, using AR the displacement of the shoulder/arm may be controlled, for example by visualizing target angles (as planes, lines, cones, etc.) in overlay. This may enable the surgeon in achieving optimum muscle lengthening required for good range of motion.

The registration may be achieved by registration module 114 through landmark driven methods (e.g. identifying corresponding landmarks in the camera data and on the virtual model, aligning any set of landmarks obtained from the patient without correspondences with the virtual model), painting based methods (e.g. annotating parts of an anatomical surface), projection based methods (e.g. by optimizing the registration through image comparison of the camera data with a rendered 3D model), surface scanning methods (e.g. obtaining a depth camera or time-of-flight image), through machine learning techniques (e.g. by learning the appearance of a 3D model in the camera through data-driven training and estimate the pose), or other methods.

For example, the user may be asked to use a pointer to outline the edges of the cartilage on the patient's femur and tibia on a digital model using a computing device, in a virtual scene while the I/O module captures movement of the pointer, etc., whereby the pre-segmented outline of that cartilage based on MRI scans can be used to perform the registration.

The user may be asked to annotate parts of the anatomy, e.g. by coloring the cartilage or drawing a pattern on the bony anatomy, on a digital model using a computing device, in a virtual scene while the I/O module captures movement of the pointer, etc., as to allow optical recognition algorithms to operate fully autonomously.

The user may be asked to annotate parts of the anatomy, e.g., by highlighting a part of the bony anatomy, on a physical anatomical 3D model corresponding to the parts of the anatomy, such as a patient-specific model using one or more markers while the I/O module captures movement of the pointer, etc., as to allow registration.

User actions for registration 218 may involve the handling of a tracked pointer or object, the surgeons hands or fingers. It may involve the user to move the pointer itself in the physical space or (actively or passively) move the camera that is registering the pointer (e.g. by moving its head when wearing a HMD).

The user may receive guidance 214, by guidance module 116, for intra-operative annotation of landmarks, surface or any other geometric feature, either via a physical object (e.g. a 3D printed model with marked registration landmarks) or via a virtual object displayed in the augmented scene. This guidance may show which landmarks need to be marked and in which order, it may show which parts of the patient anatomy are reliable for registration during marking—either for computational reasons or because specific parts of the anatomy are not well known in the virtual space (e.g. a sparse anatomical model based on X-ray imaging and a population model). This guidance may be aligned and updated with the user's steps and as he moves forward through the workflow (e.g. showing consequential landmarks after the previous have been annotated successfully). One or more camera systems may be a part of the augmented environment. One or more camera systems may be used to lock down a particular scene in the augmented environment, without being limited by the use of recognition medium (e.g., markers) or display devices. This allows the surgeon to take a break in case of long, complex surgeries or relay information to staff without losing relevant information while gathering data in real time. For example, the surgeon may require a third opinion during the surgery, for this, he may use the tele surgery option to dial in another surgeon. To be able to get an opinion from the other surgeon, the user firstly, locks the scene in his view such that during the discussion with the other surgeon, the changes suggested via tele surgery are overlaid on the locked scene, updated in real time for the surgeon in the OR to consider. If the user (surgeon in the OR) then wishes for the plan to be updated as per the suggestion, the plan is updated or else the surgeon can go back to the initial plan (as it was the locked scene) i.e., the initial data/plan is not lost and navigating is still easy.

Registration and tracking allows the user to perform various measurements, as described below.

For augmentation elements (cf. below), different virtual or actual data points or states of the patient's anatomy may be visualized by visualization module 110 on display device 104. The terminology native or constitutional is used to represent pre-diseased (or healthy) anatomy which may be reconstructed based on historical data and/or computer simulations of healthy individuals, e.g. driven by population knowledge or an understanding of disease progression. The terms pre-surgical, pre-operative or anatomical are used to represent the (diseased) anatomy of the patient before surgery. The term pre-operatively planned is used to represent the situation of the patient as it was determined using virtual planning based on medical imaging before surgery. The term intra-operatively planned is used to represent the situation in an updated plan that was created at any point during surgery based on pre-operative and intra-operative information. The term planned may refer to either pre-operatively planned or intra-operatively planned. The terms real-time or live refer to the intra-operative situation where the position of anatomy, instruments or components are tracked and used as input for a simulation process that predicts the post-operative situation.

Different states may be used separate, together, consequentially or mixed to augment the environment, depending on the information the user is looking for. Augmentation elements may belong to any one or multiple of these states.

Embodiments of the systems disclosed herein may be used pre-operatively and/or intra-operatively and/or post-operatively (to track patients during recovery).

Augmentation elements 208 are virtual and/or real data that is added to the real scene 230 to augment it. The 'augmentation elements' may be pre-determined based on medical images (through segmentation or post-processing of the data, or as a result of a surgical planning step), and/or derived from population data and/or detected intra-operatively with a camera system.

First, the surgical scene, e.g. the part of the actual scene that comprises the surgical window and all relevant anatomical parts, may be augmented by emphasizing or highlighting anatomical structures (e.g. with overlays or contours) by visualization module 110.

In an embodiment, for KA, this may include anatomical elements that are not directly visible inside the surgical window such as the full bony anatomy of the patient (predominantly femur, tibia and patella, predominantly humerus, glenoid, scapula, acromium, coracoid, etc.) or soft-tissue structures around the joint such as knee, shoulder (ligaments, muscles, nerves, vasculature, cartilage, etc.). This may also include specific parts of the anatomy that are clinically relevant (e.g. for sizing, balancing to avoid impingement) such as osteophyte, cartilage, specific parts of the bone or known defects (e.g., glenoid defect) or cartilage defects. This may also include anatomical structures that were previously removed (either already pre-operatively due to trauma or in another surgery or during the surgery itself) and need to be displayed back by visualization module 110 on display device 104, for example the pieces of bones (osteophytes, osteotomy pieces) that were removed and are visualized again on the anatomy to reconstruct the original situation. This may also include pieces of the anatomy that will be adapted by the surgery, for example highlighting the pieces of bone that will be resected based on the plan (parts of the bone that will be removed by the cuts). Through virtual overlay, transparency of parts of the anatomy may be modified to show the post-operative situation, e.g. by virtually making the bone to be removed transparent up until the cutting plane or by displaying a simulation of the bones post cutting. This may also include specific parts of the anatomy that need to be saved or protected during surgery, for example (parts of) specific muscles or ligaments that will allow to avoid fracture or dislocation when they are spared and need to be saved. The visualization module 110 may also highlight specific ligaments and muscles that can be sacrificed. Alternatively, a simulated anatomical situation (e.g., reconstructed healthy bone from the actual defected bone) may be visualized. Also, the bone-implant contact may be highlighted after the initial resection, e.g. to demonstrate the region where the implant will be properly supported and where a bone graft may be required. This may be done based on the planned implant position or based on an intra-operatively captured implant position as by the surgeon who is handling the components.

All data or any combination of data acquired from the patient may be displayed in an augmented environment 220 as an alternative to providing external screens or print-outs to display this information, e.g. through virtual or floating 2D panels in the environment. This may include the medical images that are available—such as CT images, MRI images, X-ray images or fluoroscopy images including but not limited to 2D slides, a volume-rendered image, resliced images in line with the patient orientation, etc., either acquired pre-operatively or acquired intra-operatively and shown in real time, the surgical plan as it was created, simulations of motion (or range-of-motion), predetermined implant sizes and instruments, screw lengths/type or general patient information (name, surgical side, etc.). It may also include running the surgical plan as a video or animation inside the augmented scene.

In some embodiments, the surgical scene may also be augmented with anatomical landmarks or structures directly derived from those anatomical landmarks. These may include individual locations in space (points) such as malleoli, ligament insertion points, joint rotation centers, ankle or hip tuberositas, etc. These may also include lines that represent either anatomical or mechanical axes of the individual bones or rotation axes of the joint or the mechanical axis of the entire joint system (HKA). For example, the real-time joint line may be visualized in relation to the anatomical and/or planned joint lines and/or a virtual plane In some embodiments, the surgical scene 230 may also be augmented with information that represents a mechanical, physical, anatomical or other 3D feature (which may be mapped to a surface) and which is derived from a calculation or a direct measurement 232 based on medical imaging or intra-operative data acquisitions. Examples include bone quality, e.g. derived from greyscale values in medical images, or cartilage thickness maps, derived from thickness measurements in medical images or virtual 3D models. These may be visualized as a color map overlaid on the anatomy. Another example is a simulation of the post-operative range-of-motion (or simpler: joint alignment, varus/valgus, intra-articular gap) of the joint, which may be visualized as trajectories, lines, zones or as a video, animation or dynamic 3D model. A virtual leg may be used to simulate the range of motion or ligament balancing. The interaction of the AR system with the leg allows the system to transfer to the augmented environment where the motion is simulated on a virtual model overlaid/floating above the real location to enable the surgeon to achieve the optimal post-op results. The surgeon holds the virtual knee as he would hold the real knee and performs soft tissue balancing. Post-operative range-of-motion may be simulated via (musculoskeletal or other) modeling, or by simple multibody models that predict impingement. Another example is the muscle elongation at a certain anatomical position, which may be visualized as (colored) lines or trajectories and/or as segmented and/or simulated anatomical shapes by visualization module 110 on display device 104.

In some embodiments, information about planned or simulated implant system components or component locations may also be visualized by visualization module 110 on display device 104 as part of the augmented environment. This may include screws, implants (humerus, glenoid, spacer, femur, tibia, patella, and spacer), etc. These may be displayed statically or dynamically, e.g. through the actual range-of-motion (flexion-extension) or via a simulation of the range of motion or via a robotic system. They may be used for visual analysis of the surgical plan, e.g. to evaluate sizing or screw locations, to evaluate the patellar fit into the implant groove. They may be overlaid before or after making cuts, the former by obscuring the bone to be removed virtually. The information may be updated based on information in the scene, such as the implant or instrument position. For example, screws may be virtually colored in real-time based on the bone quality they will encounter at their real-time position. Another example may be to dynamically update the optimal screw trajectories based on the implant position. Yet another example is to update a simulation of the range-of-motion based on the implant position. This may be visualized by visualization module 110 on display device 104 in overlay or using a visualization that represents the difference or similarity between the diseased or native range-of-motion, the planned range-of-motion and the simulated range-of-motion based on the real-time implant position.

In some embodiments, the AR system may be used to show the assembly of multi-component implant systems, e.g. by demonstrating how they need to be assembled, or by allowing to assess the quality of the assembly afterwards.

In some embodiments, planned or simulated instrument trajectories or locations 216 may be visualized as part of the augmented environment. This may include drilling or screwing trajectories (e.g. to insert pins that guide the cutting block positioning), cutting planes (e.g. for directly guiding osteotomies), impactor directions (e.g., to show hammer directions for impaction), or reaming volumes. All of these instrument trajectories have a location and orientation in space that is linked to the anatomical part on which the instrument is to be used. The visual elements representing the instrument trajectories should therefore be displayed as objects in 3D space of which the locations and orientations are correct with respect to the user's view of the relevant anatomical part, and follow any movement of that anatomical part through the user's field of view. Drilling or screwing trajectories may, for example, be visualized by visualization module 110 on display device 104 as solid, dashed or dotted lines, as arrows, or as elongated 3D shapes—such as cylinders or prismatic shapes—optionally with a diameter correlating to the diameter of the drill bit, pin or screw. Cutting planes may, for example, be visualized as planar shapes—such as polygons, circle segments or fan shapes—or as very thin 3D shapes—such as flat prismatic shapes or segments of thin disks—optionally with a thickness correlating to the thickness of the cutting blade. All of these objects may be visualized in any color, but preferably colors that contrast—for example in hue or luminosity—with the background. They may be shown in various degrees of transparency or fully opaque. They may be visualized with or without taking occlusion into account, as described above. For example, only the part of a drill trajectory that lies outside the bone may be shown. Optionally, they may be visualized differently depending on whether they are outside or inside of the anatomy, e.g. by changing color, transparency or texture.

The scene may also be augmented with parameters from the instruments used during surgery. This may include drills, saws, reamers, etc. Beside location and orientation parameters, parameters can include drilling speed, drill or saw temperature, etc. These may be visualized as numbers or by adapting the visualization of the drill (e.g. based on the drill temperature) or the bone (e.g. based on predicted bone necrosis at the real-time drill temperature).

Additional screw parameters may be visualized. These can include force or torque measurements acquired using the drill, representing the quality of fixation of a specific screw (or allowing the comparison of fixation between different screws).

Other relevant information such as vital signs such as heart rate, breathing patterns, anesthesia status, etc., of a patient may be visualized.

Alternatively or additionally, instrument trajectories may also be visualized as insertion locations (entry or exit) on the anatomy, such as insertion points for drills, screws or pins, or cutting lines projected on the surface of the anatomical part to be operated on. These may assist the surgeon in freehand guidance. This could also apply to the initial incision (e.g., to open the joint) where minimally invasive (or otherwise optimized or planned) cutting lines are overlaid on the patient skin.

In some embodiments, the geometric alignment of a tracked drill to the entry point location on the bone may be visualized by changing the color of a virtual point (e.g. from red to green when the Cartesian distance is smaller than a predefined threshold).

In some embodiments, for angular orientation of instruments (e.g. a drill), the user may be guided by displaying a target point on the same line as the planned trajectory, but rather than on the entry point of the drill, shown either more proximally or more distally for the user on this same line.

All of the above may not only apply to acts to be performed on bony anatomy, but also to acts to be performed on other tissues, such as muscles, fat, skin, etc. For example, this could also apply to the initial incision (to open the joint) where cutting lines for the scalpel, e.g. that are optimized for the surgical approach, are overlaid on the patient skin.

In some embodiments, the surgeon may wish to use virtual elements 208 in the augmented environment 220 corresponding to physical objects that he plans to place or use in the actual scene during surgery. This could include elements such as virtual guide wires, flags, annotations, etc., and may serve as an intermediary support tool during surgery or as reference markers for post-operative analysis. This could also be instruments such as catheters or endoscopes whose position may be measured or simulated and visualized in the augmented environment.

In some embodiments, virtually calculated components that may facilitate part of the surgical workflow may also be used to augment the environment. As an example, the surgeon may want to include grafting guidance, e.g. for glenoid grafting. These grafts can be manually shaped based on a virtually calculated template shape that is displayed in the augmented scene and can visually (or otherwise) be compared to match the shape of the graft to the template. For example, the surgeon may use one or more virtual pins and/or virtual planes for reaming guidance. A virtual plane may be visualized at the optimum reaming depth. One or more markers and/or sensors may be used for guiding the reamer. Virtual labels may also be used for marking the optimum reaming depth on the virtual plane and/or the reamer.

In some embodiments, intra-operative data or simulated metrics may be visualized as well, either as number, figures, graphs, etc. These may include data such as ligament strains (measured or simulated), predicted post-operative varus-valgus, predicted post-operative range-of-motion, etc. This may also include simple metrics such as surgical duration (time).

Specific validation or quality control elements may also be added to the scene 220. An example could be a workflow to intra-operatively validate a pre-operative plan based on a series of intra-operative steps where indications may be given that a plan needs to be adapted and how based on the complications encountered.

For all augmentation elements, a library of pre-computed (or real-time adapted) options may be used to browse through. These may include multiple sizes or implant types (e.g. posterior stabilized versus cruciate retaining) and may include different or the same planned positions ('library of plans'). Access to such a library may be limited during surgery to only show the options that remain based on the progress of the surgery and the surgical choices that were already made, providing step-by-step guidance.

Any snapshots of the surgical procedure as executed or as planned may be added to the library during or after surgery.

All augmentation elements occupy a position, e.g. a location and orientation, and have a scale or size in 3D space. Location, orientation and/or scale/size may be fixed relative to any part of the scene, such as the world coordinate system (e.g. the scene itself, the operating room), (part of) the patient, (part of) an instrument, implant or implant component, or the user's field of view. When that part of the scene moves through the world coordinate system, the system automatically tracks the movement, such as by I/O module 122, and updates the augmentation elements' locations, orientations and/or scales, such as by visualization module 110, accordingly in real time. The system also constantly tracks the position of the user's display unit, derives from that position the user's field of view, and displays by visualization module 110 within the display unit 104 all relevant augmentation elements within that field of view.

Some augmentation elements are inherently linked to an object that can move in the scene, such as an anatomical part of the patient, an actual instrument, actual implant or actual implant component. For example, an augmentation element representing a planned implant component may be displayed in its planned position with respect to a particular anatomical part of the patient in a scale of 1:1. As the anatomical part moves with respect to the world coordinate system, the virtual representation of the planned implant component follows that movement, so that its position relative to the anatomical part stays the same.

Intra-operative data, such as numbers or graphs, may be positioned in a fixed position relative to the world coordinate system: for example, on a virtual plane that has a fixed position in the operating room. As the user moves through the operating room, it appears as if the intra-op data floats at a certain position in the room, as if there were a computer display unit positioned there, but with the advantage of not having a computer display unit occupying space in the operating room. The system, such as via I/O module 122, may provide ways for the user to interact with it to change location, orientation and/or scale of the displayed elements, for example, by means of gesture-based controls.

Intra-operative data may also be displayed by visualization module 110 on display device 104 with a fixed location but a variable orientation relative to the world coordinate system: for example, on a virtual plane that has a fixed location in the operating room, but automatically orients itself towards the user.

Alternatively, intra-operative data, such as numbers or graphs, may be positioned in a fixed location relative to the user's display unit. As the user moves through the operating room, the intra-op data will remain in the same location in his field of view. In certain embodiments, such data will occupy positions in peripheral areas of the field of view.

Certain intra-op data with a particular relevance for an object in the scene 220 may also be displayed in a fixed location and/or orientation relative to that object. For example, individual ligament or muscle strains may be displayed as call-outs attached to the respective ligaments or muscles. The distal end of the call-out's pointer may have a fixed location with respect to the relevant ligament or muscle. The location, orientation and/or size of the call-out's data field may be automatically updated by the system for optimal viewing. For example, all the call-outs visible at a given moment in time may be distributed over the field of view so that their data fields don't overlap, so that their pointers don't cross and/or so that their data fields don't obscure the view of the relevant anatomical parts. For example, any text or numbers in the data fields may be displayed in the user's display unit with a constant font size, irrespective of the relative positions of the call-outs and the user's display unit.

The position of an augmentation element can also be determined per degree of freedom. Individual degrees of freedom may be linked to different parts of the scene or the user's display unit. For instance, an augmentation element that represents a set of intra-op data, such as a graph, might be a virtual plane on which the graph is shown. The position of the augmentation element may then be expressed as three spatial coordinates X, Y and Z of an origin point of the virtual plan in the world coordinate system, and three angles αX, αY and αZ representing the orientation of the normal vector of the virtual plane with respect to the world coordinate system. Each of these six degrees of freedom may then be locked on to different parts of the scene or the user's display unit. For example, X, Y and αZ may be locked onto the user's display unit 104, such that the virtual plane is always directly in front of the user and rotated towards the user, while Z, αX and αY are locked onto the world coordinate system, such that the virtual plane remains vertical and at a certain height.

In a multi-user system, it may be possible for each user to view a different selection of augmentation elements. For example, users may select which augmentation elements to view at any given moment on a corresponding display device 104. Alternatively, an automatic selection may be made by the system dependent on the role of the user (surgeon, assistant, anesthesiologist, nurse, etc.) and/or the stage of the procedure. The system may be pre-configurable in this respect to best accommodate the surgical staff's preferred way of working.

In a multi-user system, locations, orientations and/or scales of some or all augmentation elements may be configurable or optimized per user. For example, certain intra-op data may be displayed oriented towards each individual user or sized per individual user. Other augmentation elements may be visualized to more than one user in the same location, orientation and scale, such that users can concurrently look and point to the augmentation elements while discussing the details of the case.

Next to the display of virtual elements that can serve as a visual guiding tool during surgery, more explicit guidance 214 is also possible with augmented reality.

One way of achieving this is by tracking the positions of instruments (drills, sawblades, reamers, etc.) within the scene, analyzing the alignment between an instrument and its pre-planned trajectory (drilling path, saw planes, reaming path, etc.). In certain aspects, computing environment 100 includes an analysis module 118 for performing such analysis. For example, in shoulder arthroplasty, this could be relevant for the glenoid pin trajectory, humeral cut or bone graft. This analysis by analysis module 118 may produce direct parameter differences such as angles between planned and actual instrument trajectories and distances between planned and actual locations of surgical acts—e.g. distance between planned and actual entry points of a drill, difference between planned and actual reaming depth, etc.—, it may produce derived quality metrics that represent the instrument alignment ('cut quality') or it may produce resulting clinical parameter error, such as varus/valgus angle, internal/external rotation, etc. Any of these parameters 216 may be visualized by visualization module 110 on one or more display devices 104 to one or more users by means of the augmentation elements described above. Based on these parameters, warning signs, such as visual and/or audible signals, can be given to the surgeon. For example, the color or luminosity of a visualized planned instrument trajectory may vary dependent on the difference between the planned and actual instrument trajectory. Additionally or alternatively, suggestions for improved instrument alignment could also be derived by analysis module 118 and provided to the user by visualization module 110 on one or more display devices 104. For example, a straight arrow may be displayed between the tip of a drill bit and the planned entry point, or a curved arrow may be displayed between a drill and its planned trajectory to indicate how and how much the angulation of the drill should be adjusted.

Creating alignment of instruments to a planned target, e.g. aligning a drill with a planned drill position, may be split up in multiple phases by analysis module 118 or displayed via several augmentation elements, e.g. by splitting up the alignment of the drill entry point and the drill orientation.

This analysis may also be based on a range of plans and thereby aim to control only a single parameter, such as the tibial cutting plane angle (but not the cutting depth). It may use a range of acceptable locations to provide a safe zone within which no further guidance is needed. This safe zone would include all acceptable cut positions within a desired clinical objective. It could be displayed as a fan or cone instead of a plane to indicate to the surgeon which are acceptable sawblade positions. This region could be visualized differently (e.g. in size or color) depending on the position of the instruments in relation to the optimal or planned position.

Next to guidance of individual surgical steps by guidance module 116, AR can also be used to guide users through the surgical workflow. The surgical steps may be detected automatically, e.g. by tracking time, detecting voice commands or analyzing conversation patterns, tracking instrument usage (including drills, saws, implant components, guides, etc.) visually/audibly/etc., identifying and classifying the surgical scene or surgical window based on machine learning or other trained methods or a combination of the aforementioned. AR guidance may include providing, by guidance module 116, the right data at the right time, automatically (e.g. by detecting the surgical step and providing the information that belongs to this surgical step) or semi-automatically (e.g. as activated through voice or other input controls by the surgeon or his staff). It may also demonstrate appropriate instruments to use (screws, surgical instruments, etc.) and highlight these in the operating room. For example a halo may be displayed around the next instrument to be used. It may allow the surgeon to find these instruments more easily after indexing the operating room by directing the surgeon's or surgical staff's attention to the instruments through any guidance means, be it directional guidance (arrows), refocusing of the scene, or others. This may also include keeping track of the instrument inventory, such as the currently available implant or screw inventory at a specific time point during surgery.

The system may thereby also be used to automatically track instruments and their usage, e.g. by directly recognizing them from a video stream or by attaching or embedding a marker system on the instruments. An example could be to track screw lengths with a (bar) code scanner integrated into the system and/or using color-coded markers (or sensors) for identifying instruments For invasive acts, such as cutting or drilling, it may not be advisable or even allowed by law to obscure the area anatomy where the invasive act is to be performed by augmentation elements. The system may therefore detect the handling of an invasive instrument, such as a drill or saw, and automatically make it impossible to display such augmentation elements as long as the instrument is being operated. For example, at any given stage of the surgery, the system may detect the user picking up or activating a drill, and may automatically hide visual representations of any planned implant components that would obscure the part of the anatomy in which the surgeon is to drill at that stage of the surgery.

During surgery, certain actions may cause damage to tissue structures or may lead to unwanted side effects after or during surgery. In certain aspects, computing environment 100 includes a feedback module 120. The feedback module 120 can generate warning signs for display by visualization module 110 through display device 104, or through I/O module 122, to prevent those. Such warning signs can include visual, audible or haptic feedback. For visual feedback, the alerts may be provided by highlighting specific parts of the scene. This may include highlighting instruments or anatomy (using colors, illumination or other means) to stop the user from advancing the instruments any further. Alternatively, the alerts may trigger a broader response on the entire field-of-view, for example by coloring it in a specific shade. Alternatively, a traffic light system may be implemented.

For example, a warning sign may be given by feedback module 120 while making cuts, where based on the sawblade location an estimate is made of the risk of damaging soft-tissue structures such as the cruciate ligaments. This may also apply for reaming depth. Warning signs could also warn for unwanted situations, e.g. peg perforation.

The warning signs may be linked to guidance elements that give suggestions on improving component position or planning, e.g. increase/decrease retroversion, decrease reaming distance, etc.

A warning sign may also be displayed to alert the user for rinsing (e.g. on pre-determined time points to reduce the chance of infection).

A warning sign may also be given to alert the surgeon that he is not using the same devices as they were planned. This could be done by detecting the implant components or fixation elements that the surgeon is using and comparing them to the pre-op plan.

The augmented reality system may interact with other physical guiding systems such as patient-specific or generic cutting guides/blocks, robots or other systems, such as via I/O module 122.

The versatility of the AR system may allow the user to use it with existing technology such as patient-specific guides. A surgeon may prefer to use a patient-specific guide but to have more information available to him in the OR. The AR system may recognize the guide by means of any shape or feature-recognition techniques known in the art, and may display relevant information about the guide or the underlying bone, display trajectories of instruments that would interact with the guide, mark the pose of the guide, etc. The guide itself may contain specific landmarks (such as EPI axis, mechanical axis, landmarks, etc.) that are aligned with the augmentation elements in the augmented scene, e.g. for aligning the guide, registering the scene or for quality control motivations.

A patient-specific guide system may also be used as a reference marker for the AR system. Based on the unique fit of a patient-specific guide system, it may immediately initialize the registration by registration module 114, either by attaching a marker to the guide or by using the guide itself as a marker. Also, by tracing the contour or specific features of the guide with a pen or guided marker, registration 218 may be performed.

For traditional patient-specific guiding systems, a unique, easy and stable fit to the anatomy is required. Using AR, this may be improved. First, the AR system may increase the 'easiness' of finding the fit with the anatomy e.g. by highlighting the guide outline before placement. Further, using the AR system, a unique fit is no longer a requirement as the AR system can determine whether the guide is in the correct position, even if it could possibly fit in multiple positions. Also, the AR system introduces the possibility to reduce a guide's footprint by not having to look for anatomy that would make the fit unique. Also, combining the AR system with a patient-specific guide may allow creation of a stable guide based on less information, e.g. by performing the design on lower-dimensional data (X-ray instead of 3D imaging) and correct for potential variations introduced to the sparsity of the 2D information with intra-operatively acquired AR information. Additionally, some features may be eliminated in the guide system and replaced by augmented elements in the augmented scene, e.g. the tibial rod feature on the tibia guide to align with the mechanical axis. Adaptive guide systems (which may be patient-specific) may also be configured, modulated or setup using the AR system. For example, this may include guide systems that have multiple contact surfaces to modify an angulation or seating position, where the AR system can show the correct position or configuration of the adaptive guide. In another example, this may also include providing guidance on the use of specific cutting slots or drill barrels, where multiple options may be provided by the guide system and the appropriate option is highlighted using the AR system.

In some embodiments, the AR system, such as via guidance module 116, may interact with standard or adjustable instrumentation to provide the right settings for adjustable instruments (such as angles, lengths) based on the surgical plan. These settings may be displayed on and/or around the instrument itself. For quality assurance reasons, the settings of the instruments may be automatically detected using the camera system to validate. Based on the actual settings of the instruments, the plan may be recalculated automatically. An instrument's position may be tracked automatically in relation to the bone (either using a marker attached to or incorporated in the instrument or using the shape of the instrument itself as a marker). The location of instrument guiding elements (e.g., cutting slots, drilling holes) on the instruments may be virtually augmented with cutting planes, drilling lines, any other guidance mechanism, etc. These virtual elements can directly interact with the anatomy of the patient and adapt the visualization of this anatomy, as described earlier. The system may track the instrument stock in real time, for examples the number and type of screws already inserted in the patient. This may be tracked by using optical recognition to recognize the instrument or their packaging or (parts of) their labeling.

In some embodiments, the I/O module 122 for example, may be able to interact with a robot system, e.g. by actively positioning a robot arm or providing instructions for manual positioning of the robot arm, e.g. by showing a target position or providing force-based guidance to the robot. In some embodiments, the system is used to control the robot, e.g. by integrating the robot control user interface in the AR system. The warning signs, safety zones or other controlling features in the AR system may also directly control the physical guidance system, e.g. by controlling the drilling, reaming or sawing speed (modulated or a simple on/off switch). A surgeon may simulate the range of motion or ligament balancing on a robotic leg. The interaction of the AR system with the robotic leg would track the movement of the robotic leg and transfer the measurements to the augmented environment to guide the surgeon for performing it on the real knee.

In certain embodiments, users can interact with the system via a series of explicit or implicit commands, such as via I/O module 122. Explicit commands may include one or more of voice control, e.g. spoken commands, captured by the system through a speech-recognition module, gestures, captured through gesture tracking, or touch-based commands, such as pressing a button, a pedal, a touch screen, or (haptic) controllers coupled to I/O module 122. Implicit commands refer to actions of the user that automatically lead to a certain system behavior. For example, head motion tracking, eye tracking or gaze tracking, etc. may all instruct the system to display, hide or alter the position or scale of certain augmentation elements. One or more combinations may be used.

In some embodiments, the system is customizable by providing one or more options to augment the real scene with virtual objects (environments) and allowing the user to control the interaction between the physical scene and the augmented environment by providing an on/off setting to switch between environments.

In some embodiments, the system may detect the surgeon's gaze using eye tracking or gaze tracking. This allows the system to either create focused visualizations or to clear virtual elements from the augmented scene for better visualization of the scene. Using artificial intelligence or machine learning techniques, the system may be trained to perform this function.

Although in some embodiments the main function of the system is to assist the surgeon in the OR, the system when coupled with smart health devices (such as smartwatches, smartphones, tracking devices, etc.) may also be used to track health of the patient post-surgery, and based on the information gathered and by comparing it with stored patient data, the system may provide assistance/guidance to the patient during recovery by displaying exercises in an augmented environment and tracking patient movement to gather information regarding soft tissue balancing, range of motion, flexibility, etc.

One form of interaction with the system is indicating, such as via I/O module 122, certain points in the scene, such as anatomical landmarks. In some embodiments, indicating points on the anatomy can be performed by using a tracked pointing device, such as a stylus (e.g., an input device coupled to I/O module 122). In other embodiments, points may be indicated without using a pointing device. For example, after entering into an "indicate point" mode, a target symbol, such as cross hairs, may be displayed to the user in the display unit. These cross hairs may be then be moved by head or eye movement, until they point to the desired anatomical point, at which time the user can give the command to lock the position. In yet other embodiments, such a target symbol may be moved manually by the user. In such embodiments, the system may detect hand or finger movements in the user's field of view and translate those movements to movements of the target symbol. By varying the speed at which the target symbol is moved relative to the speed of the hand or finger movements, the system may allow anything from rough indication to fine-tuning.

As the augmented reality system is able to determine the pose and location of anatomy and instruments, it may be used to perform measurements intra-operatively. These measurements may influence the planning procedure or be used to display specific information.

In some embodiments, a measurement may be performed that involves the parameters of a cut based on a saw blade position. By tracking the cut as it would be performed with the sawblade in a particular position, the augmented scene can be adapted to display the effect of this sawblade position on the patient anatomy. This can be done by extracting anatomical parameters from the sawblade position in relation to the virtual model (e.g. calculating the effect a cut at a specific position would have on the virtual model). Such parameters could include amount of bone resected (volume, distance, resection level, angulation, etc.). These parameters could be converted to a clinical parameter such as varus-valgus angle, tibial slope, etc. This may provide implicit guidance, for example for surgeons who chose not to plan the case but still want additional anatomical parameters to work with.

In some embodiments, a measurement that may be taken is the load/weight-bearing hip-knee-ankle (HKA) angle and its relation to the mechanical axis.

In some embodiments, during soft-tissue balancing, the surgeon is exerting force to the lower leg to subjectively assess the stability of the joint. These may include medio-lateral forces simulating a varus/valgus movement. These may also include a passive movement through the range-of-motion. These may also include intra-articular forces applied to any part of the femur or tibia to stretch the joint to its natural (or otherwise desired) soft-tissue tension. Using intra-operative measurement tools (such as sensors), more objective assessment of the balance may be achieved. However, this is still dependent on the manual and uncontrolled force input by the surgeon. This may be controlled using a force sensor, e.g., coupled to I/O module 122. Alternatively or additionally, using AR, the displacement of the lower leg may be tracked or controlled, for example by visualizing target angles (as planes, lines, cones, etc.) in overlay or monitoring the leg's position and synchronizing it with the surgeon's force input. This may further objectify knee balancing and improve sensor analysis.

Also, the AR system may be used to track the relative position of the individual bones in the joint to determine the stable (e.g., isometric and pre-tensioned) position of the joint, mainly determined by the collateral ligaments.

In another embodiment, anatomical landmarks can be manually annotated using a tracked device or pointer or by visually detecting the landmarks through the camera. From these anatomical landmarks, secondary measurements can be derived.

The augmented environment (and/or the individual virtual and physical scene components) may be recorded 234 for archiving, either as a video stream or a sub-selection of individual frames may be taken at any point during the surgery. In certain aspects, computing environment 100 includes a recording/streaming module 124 be configured to perform such recording. The scenes may be streamed by recording/streaming module 124 to an external audience 228 for tele surgery purposes, peer assistance and/or clinical engineering support. The external audience may interact with any virtual component of the scene to modify the augmented environment, thereby providing additional support. The environment may also be analyzed in relation to other surgeons, to provide a workflow analysis and improvement suggestions that would make the surgery more efficient. The environment may also be used for training purposes.

By tracking the implant position intra-operatively, the actual position of the implant as it was placed may be recorded by recording/streaming module 124, either to avoid post-operative imaging or to complement post-operative imaging. This data may be used to do post-operative analysis.

The augmented environment may also be used to keep additional staff informed on surgical decisions/status of surgery so they can prepare themselves better, for example by highlighting the next instrument that will be needed or the screw length that should be taken out of the inventory. The augmented environment may also be stored for future references wherein it can later be played as a movie, as needed. The system also enables the surgeon to pause, play, capture any part (s) of the augment environment in the form of snapshots and/or live motion pictures at any time during its use.

The AR system may also be used to provide anesthesia guidance for patients, e.g. by showing breathing patterns or other types of guidance.

Various embodiments disclosed herein provide for the use of computer software being executed on a computing device. A skilled artisan will readily appreciate that these embodiments may be implemented using numerous different types of computing devices, including both general-purpose and/or special-purpose computing system environments or configurations. Examples of well-known computing systems, environments, and/or configurations that may be suitable for use in connection with the embodiments set forth above may include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like. These devices may include stored instructions, which, when executed by a microprocessor in the computing device, cause the computer device to perform specified actions to carry out the instructions. As used herein, instructions refer to computer-implemented steps for processing information in the system. Instructions can be implemented in software, firmware or hardware and include any type of programmed step undertaken by components of the system. Various wearable and/or portable devices for viewing the augmenting environment such as Microsoft Hololens, etc. may be used. These devices maybe connected to the computing device wirelessly or wired.

A microprocessor may be any conventional general purpose single- or multi-chip microprocessor such as a Pentium® processor, a Pentium® Pro processor, a 8051 processor, a MIPS® processor, a Power PC® processor, or an Alpha® processor. In addition, the microprocessor may be any conventional special purpose microprocessor such as a digital signal processor or a graphics processor. The microprocessor typically has conventional address lines, conventional data lines, and one or more conventional control lines.

Aspects and embodiments of the inventions disclosed herein may be implemented as a method, apparatus or article of manufacture using standard programming or engineering techniques to produce software, firmware, hardware, or any combination thereof. The term "article of manufacture" as used herein refers to code or logic implemented in hardware or non-transitory computer readable media such as optical storage devices, and volatile or non-volatile memory devices or transitory computer readable media such as signals, carrier waves, etc. Such hardware may include, but is not limited to, field programmable gate arrays (FPGAs), application-specific integrated circuits (ASICs), complex programmable logic devices (CPLDs), programmable logic arrays (PLAs), microprocessors, or other similar processing devices.

Figure 3:
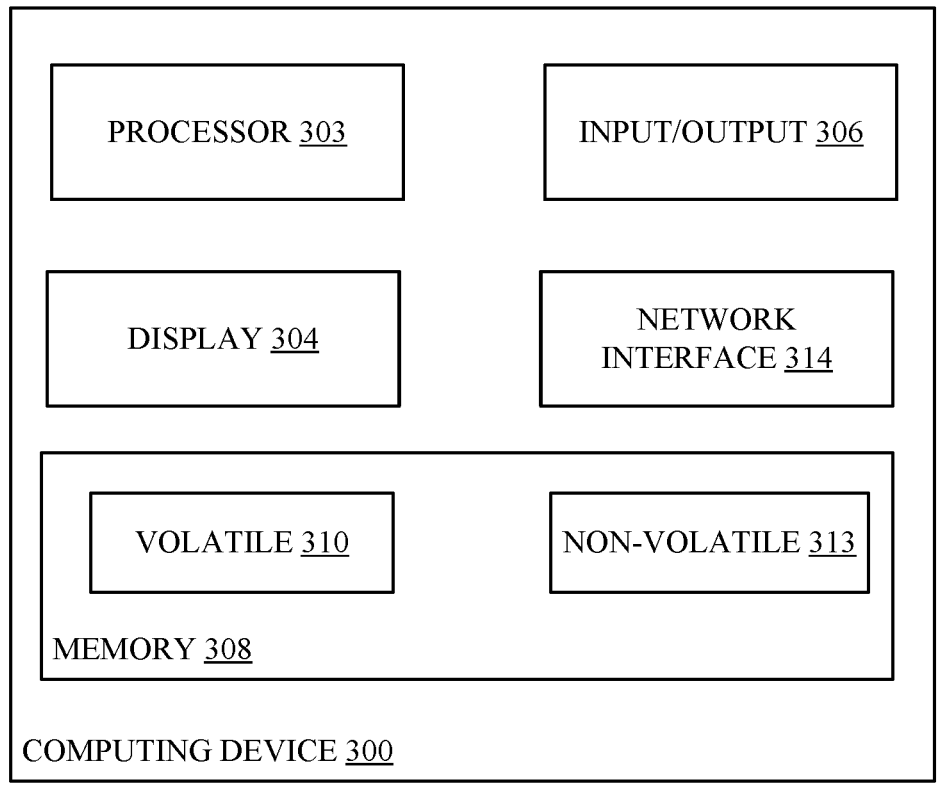
FIG. 3 is a high level system diagram of a computing system that may be used in accordance with one or more embodiments.

Various embodiments of the invention may be implemented using general and/or special purpose computing devices. Turning now to FIG. 3, an example of a computing device 300 suitable for implementing various embodiments of the invention is shown. The computer system 300 may generally take the form of computer hardware configured to execute certain processes and instructions in accordance with various aspects of one or more embodiments described herein. The computer hardware may be a single computer or it may be multiple computers configured to work together. The computing device 300 includes a processor 303. The processor 303 may be one or more standard personal computer processor such as those designed and/or distributed by Intel, Advanced Micro Devices, Apple, or ARM. The processor 303 may also be a more specialized processor designed specifically for image processing and/or analysis. The computing device 300 may also include a display 304. The display 304 may be a standard computer monitor such as, an LCD monitor, an overhead display, and/or a head mounted display, etc. The display 304 may also take the form of a display integrated into the body of the computing device, for example as with an all-in-one computing device or a tablet computer.

The computing device 300 may also include input/output devices 306. These may include standard peripherals such as keyboards, mice, printers, stylus, cameras, sensors, and other basic I/O software and hardware. The computing device 300 may further include memory 308. The memory 308 may take various forms. For example, the memory 308 may include volatile memory 310. The volatile memory 310 may be some form of random access memory, and may be generally configured to load executable software modules into memory so that the software modules may be executed by the processor 303 in a manner well known in the art. The software modules may be stored in a nonvolatile memory 313. The non-volatile memory 313 may take the form of a hard disk drive, a flash memory, a solid state hard drive or some other form of non-volatile memory. The non-volatile memory 313 may also be used to store non-executable data, such database files and the like.

The computer device 300 also may include a network interface 314. The network interface may take the form of a network interface card and its corresponding software drivers and/or firmware configured to provide the system 300 with access to a network (such as the Internet, for example). The network interface card 314 may be configured to access various different types of networks, such as those described above in connection with FIG. 1. For example the network interface card 314 may be configured to access private networks that are not publicly accessible. The network interface card 314 may also be configured to access wireless networks such using wireless data transfer technologies such as EVDO, WiMax, or LTE network. Although a single network interface 314 is shown in FIG. 3, multiple network interface cards 314 may be present in order to access different types of networks. In addition, a single network interface card 314 may be configured to allow access to multiple different types of networks.

In general, the computing environment 100 shown in FIG. 1 may generally include one, a few, or many different types of computing devices 300 which work together to carry out various embodiments described below. A skilled artisan will readily appreciate that various different types of computing devices and network configurations may be implemented to carry out the inventive systems and methods disclosed herein.

Figure 4:
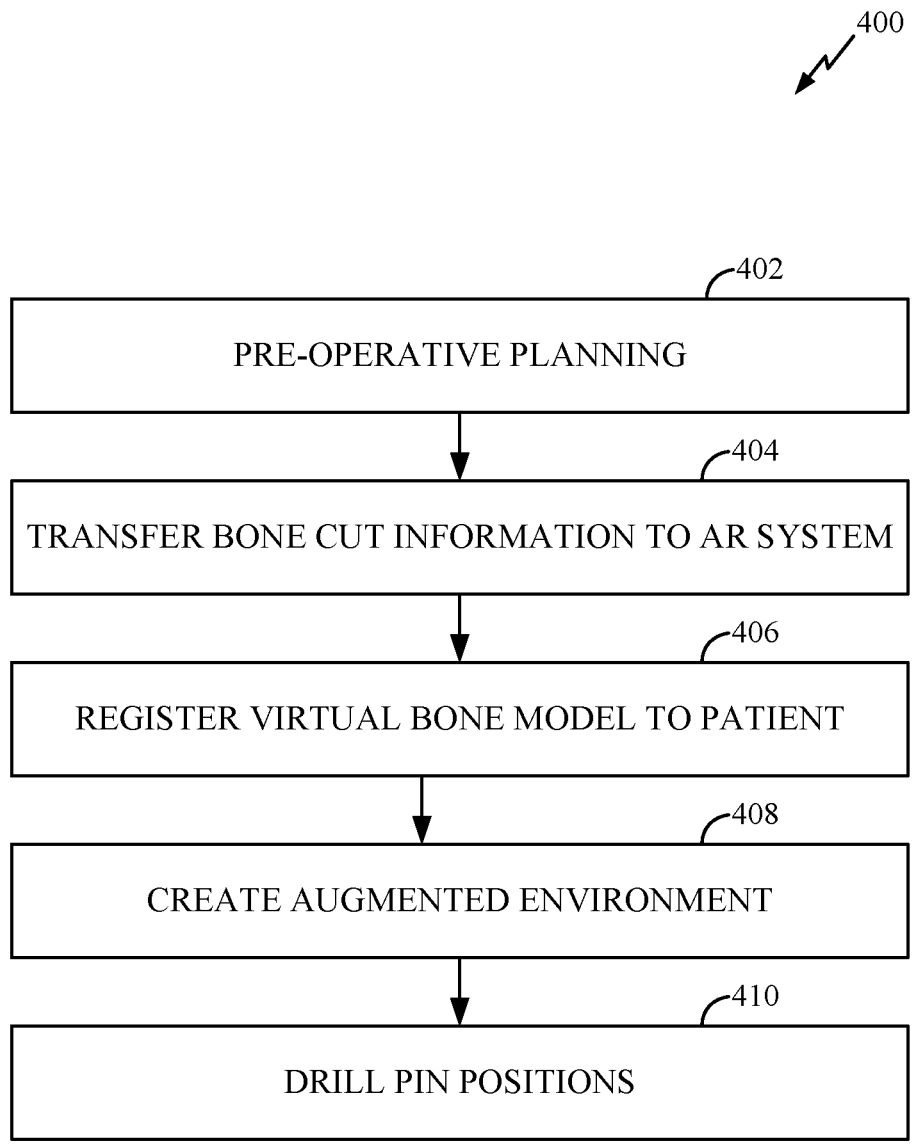
FIG. 4 illustrates a flow chart showing a process for operating an augmented reality system for making pre-planned cuts in a total knee arthroplasty, according to certain embodiments.

To illustrate as an example, a very simple workflow may be implemented with the AR system of computing environment 100 for making pre-planned cuts in a total knee arthroplasty. FIG. 4 illustrates a flow chart showing a process 400 for operating an augmented reality system for making pre-planned cuts in a total knee arthroplasty, according to certain embodiments.

At block 402, pre-operative planning is performed beforehand on a conventional planning workstation. This defines the implant type, size and its position in relation to the anatomy. From this, the orientation of bone cuts are derived for the tibia and for the distal and posterior femur. The positions of drill pins that determine the cutting guide position are also determined.

At block 404, the location and orientation of the bone cuts in relation to the anatomy are transferred to the intra-operative AR application that is running on an AR headset worn by the surgeon. Drill pins (orientation and position in relation to the anatomy) are also transferred to the AR system.

At block 406, the surgeon registers the virtual bone models of tibia and femur to the patient using a series of pre-defined landmarks that he is annotating with a tracked pointer. One or more physical markers are attached to femur and tibia to track the position after registration.

At block 408, the augmented environment is created. Here, one or more augmentation elements are added to the reality, such as:
  virtual bone models are overlaid semi-transparently on the actual anatomy as a visual reference and quality metric;
  planned bone cuts are visualized as lines on the surface of the intra-operative tibia and femur bone;
  a semi-transparent plane is visualized to represent the bone cut, taking into account the occlusion of the bones (the plane is only shown outside the volume of the bones); and/or
  planned drill pin positions are visualized as lines and entry holes.

At block 410, a drill is used to place the bone pins. The drill itself may be attached to a physical marker that is tracked by the AR system. The color of the virtual drill positions may be modified according to the position of the drill in relation to the planned drill position, e.g. red when outside a certain threshold (2 degrees, 2 mm), green when inside that threshold. Arrows may be shown interactively to demonstrate how the drill position needs to be adapted to create a good alignment. The holes are drilled.

The AR system may not be used for the remainder of the procedure.

Figure 5:
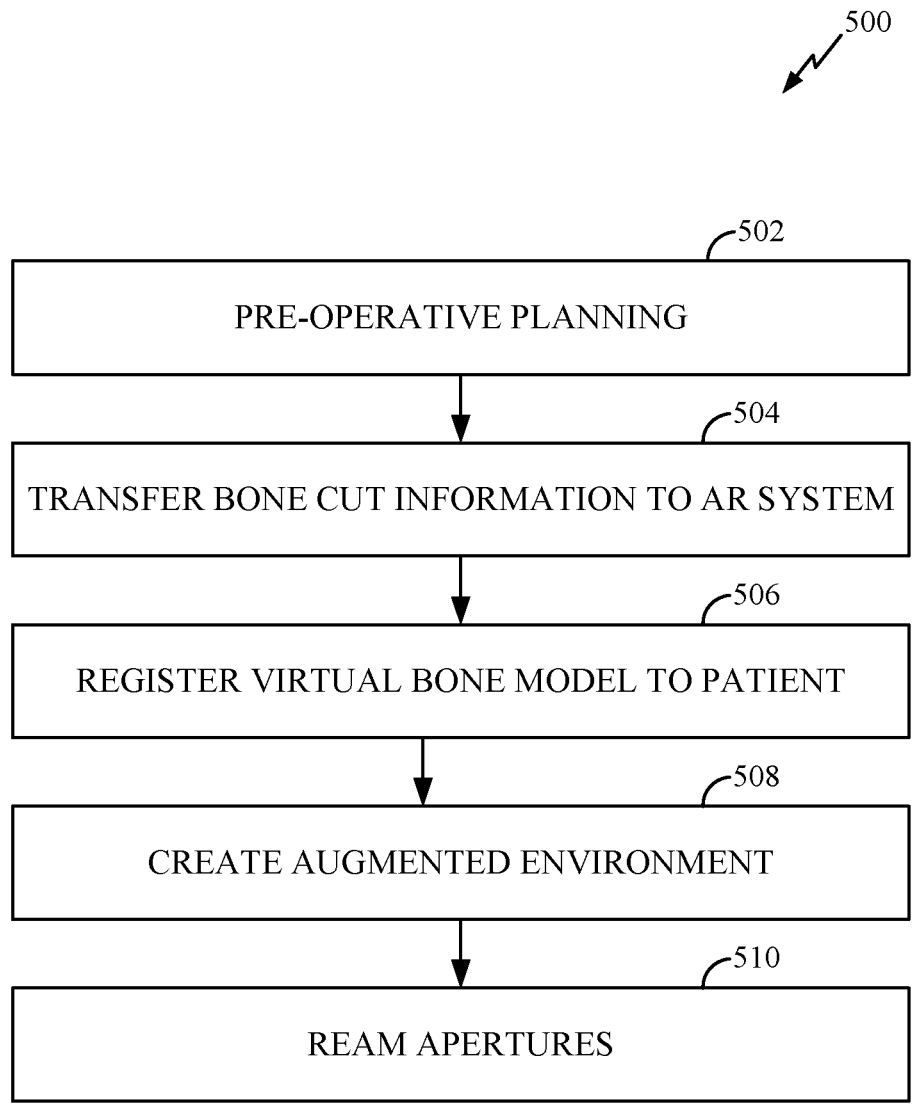
FIG. 5 illustrates a flow chart showing a process for operating an augmented reality system for making pre-planned cuts in a total shoulder arthroplasty, according to certain embodiments.

To illustrate as an example, a very simple workflow may be implemented with the AR system of computing environment 100 for making pre-planned apertures during total shoulder arthroplasty. FIG. 5 illustrates a flow chart showing a process 500 for operating an augmented reality system for making pre-planned cuts in a total shoulder arthroplasty, according to certain embodiments.

At block 502, pre-operative planning is performed beforehand on a conventional planning workstation. This defines the implant type, size and its position in relation to the anatomy. From this, the number, size and location of apertures are derived for the glenoid cavity.

At block 504, the number, size and location in relation to the anatomy are transferred to the intra-operative AR application that is running on an AR headset worn by the surgeon.

At block 506, the surgeon registers the virtual bone models of glenoid and humerus to the patient using physical markers.

After registration, at block 508, the augmented environment is created. Here, one or more augmentation elements are added to the reality, such as:

virtual bone models are overlaid semi-transparently on the actual anatomy as a visual reference and quality metric, planned apertures are visualized as tunnels or drill cylinders on the surface of the intra-operative glenoid bone; and/or a semi-transparent plane is visualized to represent the depth of the aperture (or tunnel), taking into account the occlusion of the bones (the plane is only shown outside the volume of the bones).

At block 510, a reamer is used to make the apertures. The reamer itself may be attached to a physical marker that is tracked by the AR system. The reamer may be augmented by recolouring it along the axis as markings: red=not within a 1 mm, Green=within a 1-2 mm. The apertures are made. In certain embodiments, the system detects the reamer's position in the bone and gives a warning signal when the reaming distance exceeds the optimum (pre-planned) depth to avoid loss of bone stock.

The AR system may not be used for the remainder of the procedure.

In other embodiments, the procedure may be planned intra-operatively in its entirety wherein the surgeon takes with him medical images and 3D virtual models in the OR and plans the remainder of the surgery in real time using the augmented reality system.

FIG. 6 illustrates a flow chart showing a process 600 for operating an augmented reality system, according to certain embodiments. Process 600 may be performed by a computing device, such as device 300.

Process 600 begins at block 602, by generating a virtual scene and registering it to a physical scene to generate an augmented scene. At block 604, pre-operative measurements are measured in the augmented scene. For example, the measurements may include one or more of the distances between individual bones, the range-of-motion of the joint, tissue properties or soft-tissue attachments, etc. In certain embodiments, the measurements are used to update a pre-operative surgical plan, such as by providing the measurements to a modeling or machine learning system that adapts planning parameters of the pre-operative surgical plan. The adapted planning parameters may be used to update the virtual scene and, potentially without re-performing the registration, the augmented scene is updated.

At block 606, the augmented scene may be visualized to the user, such as prior to performing the surgery, such as a cut. At block 608, the user may provide inputs based on the visualization to adapt the planning parameters, and the process may return to block 606 to visualize the updated augmented scene accordingly.

At block 610, a surgeon may execute the plan by performing drilling and/or cutting as part of a surgery. At block 612, after executing the plan, additional evaluation measurements can be performed. These may allow to evaluate the execution, e.g. by evaluating the expected outcome based on the actual position of the implant components. Based on this information, further plan adaptations can be suggested at block 608 and 606 and the surgeon may wish to redo certain parts of the procedure at block 610, e.g. re-cutting certain bones. When the final plan has been executed, the augmented reality system may be used to perform post-operative measurements at block 614.

Figure 7:
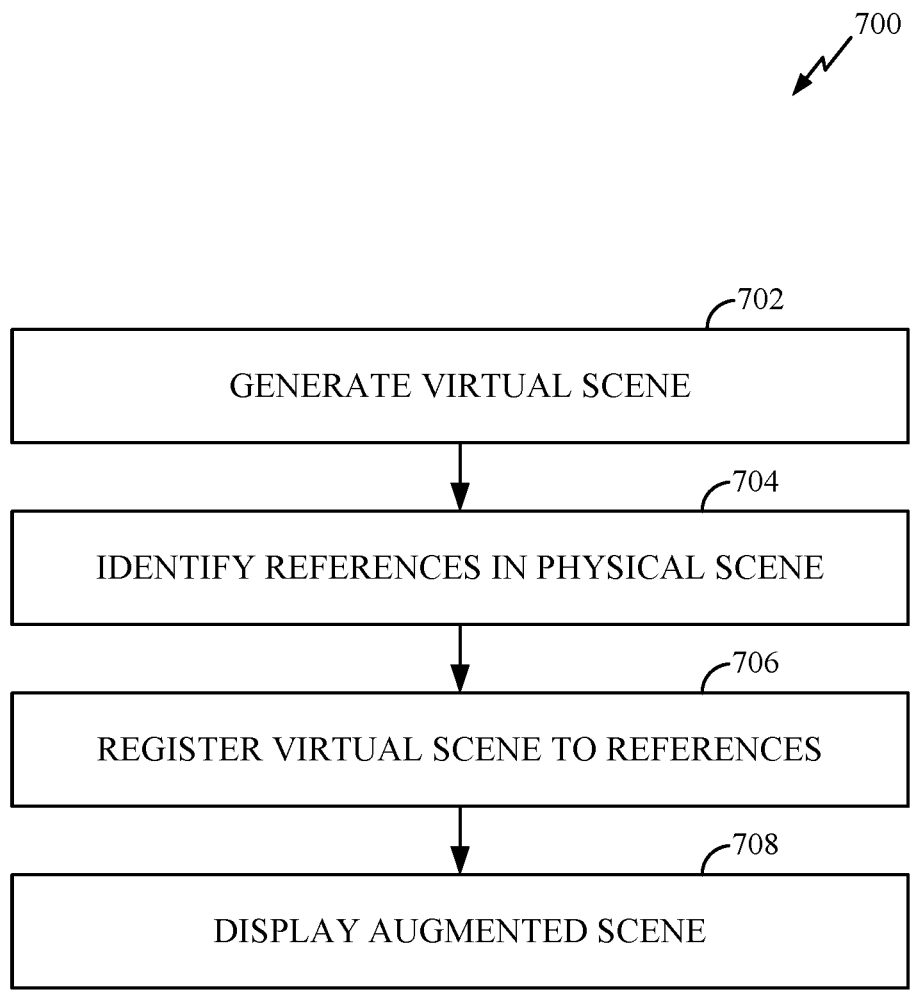
FIG. 7 illustrates a flow chart showing a process for operating an augmented reality system, according to certain embodiments.

FIG. 7 illustrates a flow chart showing a process 700 for operating an augmented reality system such as to provide augmented reality assisted surgery, according to certain embodiments. Process 700 may be performed by a computing device, such as device 300.

Process 700 begins at block 702, by generating a virtual scene comprising one or more virtual elements comprising one or more anatomical elements corresponding to one or more anatomy parts. Further, at block 704, one or more references are identified in an actual physical scene comprising the one or more anatomy parts.

Continuing, at block 706, the virtual scene is registered to the one or more references to generate an augmented scene. At block 708, the augmented scene is displayed on a display device.

In certain embodiments, process 700 further includes acquiring one or more images of the actual physical scene.

In certain embodiments, the one or more references comprise a patient-specific guide placed on the one or more anatomy parts.

In certain embodiments, process 700 further includes acquiring at least one image of the one or more anatomy parts; and segmenting the at least one image to generate one or more virtual 3D models of the one or more anatomy parts.

In certain embodiments, process 700 further includes acquiring one or more virtual 3D models of the one or more anatomy parts; determining one or more implant components based on the one or more virtual 3D models; determining a size and a position for the one or more implant components based on the one or more virtual 3D models; and wherein the one or more anatomical elements comprise a depiction of the one or more implant components having the determined size in the determined position.

In certain embodiments, the one or more anatomical elements comprise portions of the one or more anatomy parts obscured in the one or more images.

In certain embodiments, the one or more anatomical elements comprise highlights corresponding to the one or more anatomy parts.

In certain embodiments, the one or more references comprise physical markers or objects in the actual physical scene.

In certain embodiments, the one or more references comprise landmarks on the one or more anatomy parts.

In certain embodiments, input of the one or more references is received via a marking device.

In certain embodiments, input of the one or more references is received via a surgical plan.

In certain embodiments, process 700 further includes acquiring one or more virtual 3D models of the one or more anatomy parts, wherein the one or more references are automatically determined by performing shape recognition on the one or more virtual 3D models and the one or more images of the physical scene.

In certain embodiments, process 700 further includes performing one or more measurements of the one or more anatomy parts based on the one or more images, wherein the one or more anatomical elements comprise the one or more measurements.

In certain embodiments, the one or more anatomical elements comprise guidance for one or more steps of a surgical procedure, and the one or more anatomical elements are displayed in an order corresponding to the steps of the surgical procedure.

In certain embodiments, the one or more anatomical elements comprise planned or simulated instrument trajectories for performing surgery on the one or more anatomy parts.

In certain embodiments, process 700 further includes determining an alignment between an instrument in the one or more images and a planned trajectory for the instrument, wherein the one or more anatomical elements indicate the alignment.

In certain embodiments, process 700 further includes determining, based on the one or more images or another input, which step of a plurality of steps of a surgery the one or more images corresponds to; and generating at least one of the one or more anatomical elements that belong to the determined step based on the determined step.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims. Further, one or more blocks/steps may be removed or added.

Various embodiments disclosed herein provide for the use of a computer system to perform certain features. A skilled artisan will readily appreciate that these embodiments may be implemented using numerous different types of computing devices, including both general-purpose and/or special-purpose computing system environments or configurations. Examples of well-known computing systems, environments, and/or configurations that may be suitable for use in connection with the embodiments set forth above may include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like. These devices may include stored instructions, which, when executed by a microprocessor in the computing device, cause the computer device to perform specified actions to carry out the instructions. As used herein, instructions refer to computer-implemented steps for processing information in the system. Instructions can be implemented in software, firmware or hardware and include any type of programmed step undertaken by components of the system.

A microprocessor may be any conventional general-purpose single- or multi-chip microprocessor such as a Pentium® processor, a Pentium® Pro processor, a 8051 processor, a MIPS® processor, a Power PC® processor, or an Alpha® processor. In addition, the microprocessor may be any conventional special-purpose microprocessor such as a digital signal processor or a graphics processor. The microprocessor typically has conventional address lines, conventional data lines, and one or more conventional control lines.

Aspects and embodiments of the inventions disclosed herein may be implemented as a method, apparatus or article of manufacture using standard programming or engineering techniques to produce software, firmware, hardware, or any combination thereof. The term "article of manufacture" as used herein refers to code or logic implemented in hardware or non-transitory computer readable media such as optical storage devices, and volatile or non-volatile memory devices or transitory computer readable media such as signals, carrier waves, etc. Such hardware may include, but is not limited to, field programmable gate arrays (FPGAs), application-specific integrated circuits (ASICs), complex programmable logic devices (CPLDs), programmable logic arrays (PLAs), microprocessors, or other similar processing devices.

What is claimed is:

1. A method of performing augmented reality assisted surgery, the method comprising:
generating a virtual scene comprising one or more virtual elements comprising one or more anatomical elements corresponding to one or more anatomy parts of a patient;
acquiring one or more images of an actual physical scene comprising the one or more anatomy parts;
automatically determining, based on the one or more images or another input, a step of a plurality of steps of a surgery the one or more images correspond to;
limiting access to a library of augmentation element options during the step of the surgery to only show a subset of augmentation element options of the library of augmentation element options during the step of the surgery, the subset of augmentation element options corresponding to the step of the plurality of steps of the surgery;
automatically identifying one or more references in the actual physical scene during the surgery;
registering, during the step of the surgery, the virtual scene to the one or more references to generate an augmented scene comprising one or more augmentation elements configured based on one or more augmentation element options selected from the subset of augmentation element options; and
displaying, during the surgery, the augmented scene as an overlay on an anatomy of the patient via a display device.

2. The method of claim 1, wherein the one or more references comprise a patient-specific guide placed on the one or more anatomy parts.

3. The method of claim 1, wherein the one or more images comprise at least one image of the one or more anatomy parts, and further comprising:
segmenting the at least one image to generate one or more virtual 3D models of the one or more anatomy parts.

4. The method of claim 1, further comprising:
acquiring one or more virtual 3D models of the one or more anatomy parts;
determining one or more implant components based on the one or more virtual 3D models; and
determining a size and a position for the one or more implant components based on the one or more virtual 3D models;
wherein the one or more anatomical elements comprise a depiction of the one or more implant components having the determined size in the determined position.

5. The method of claim 1, wherein the one or more anatomical elements comprise portions of the one or more anatomy parts obscured in the one or more images.

6. The method of claim 1, wherein the one or more anatomical elements comprise highlights corresponding to the one or more anatomy parts.

7. The method of claim 1, wherein the one or more references comprise physical markers or objects in the actual physical scene.

8. The method of claim 1, further comprising acquiring one or more virtual 3D models of the one or more anatomy parts, wherein the one or more references are automatically determined by performing shape recognition on the one or more virtual 3D models and one or more images of the actual physical scene.

9. The method of claim 1, further comprising:
performing one or more measurements of the one or more anatomy parts based on the one or more images, wherein the one or more anatomical elements comprise the one or more measurements.

10. The method of claim 1, wherein the one or more anatomical elements comprise guidance for one or more steps of a surgical procedure, and the one or more anatomical elements are displayed in an order corresponding to the steps of the surgical procedure.

11. The method of claim 1, wherein the one or more anatomical elements comprise planned or simulated instrument trajectories for performing surgery on the one or more anatomy parts.

12. The method of claim 1, further comprising determining an alignment between an instrument in the one or more images and a planned trajectory for the instrument, wherein the one or more anatomical elements indicate the alignment.

13. The method of claim 1, further comprising:
generating at least one of the one or more anatomical elements that belong to the step based on the step.

14. The method of claim 1, wherein the library of augmentation element options comprises one or more options for configuring an augmentation element according to one or more of an augmentation element size, an augmentation element type, or an augmentation element position.

15. The method of claim 1, wherein the one or more references include one or more bones of the patient.

16. The method of claim 1, further comprising:
automatically tracking a position of an instrument in relation to a bone; and
modifying the augmented scene with one or more instrument guiding elements.

17. The method of claim 1, further comprising:
updating the augmented scene based on determining occurrence of another step of the plurality of steps of the surgery.

18. The method of claim 1, further comprising:
identifying a relative movement between the display device and the one or more references; and
updating a position of the one or more augmentations elements on the display device to track the relative movement.

19. A non-transitory computer-readable medium having computer-executable instructions stored thereon, which, when executed by one or more processors of a computing device, cause the computing device to perform a method of providing augmented reality assisted surgery, the method comprising:
generating a virtual scene comprising one or more virtual elements comprising one or more anatomical elements corresponding to one or more anatomy parts of a patient;
acquiring one or more images of an actual physical scene comprising the one or more anatomy parts;
automatically determining, based on the one or more images or another input, a step of a plurality of steps of a surgery the one or more images correspond to;
limiting access to a library of augmentation element options during the step of the surgery to only show a subset of augmentation element options of the library of augmentation element options during the step of the surgery, the subset of augmentation element options corresponding to the step of the plurality of steps of the surgery;
automatically identifying one or more references in the actual physical scene during the surgery;
registering, during the step of the surgery, the virtual scene to the one or more references to generate an augmented scene comprising one or more augmentation elements configured based on one or more augmentation element options selected from the subset of augmentation element options; and
displaying, during the surgery, the augmented scene as an overlay on an anatomy of the patient via a display device.

20. A computing device comprising:
one or more memories; and
one or more processors configured to cause the computing device to:
generate a virtual scene comprising one or more virtual elements comprising one or more anatomical elements corresponding to one or more anatomy parts of a patient;
acquire one or more images of an actual physical scene comprising the one or more anatomy parts;
automatically determine, based on the one or more images or another input, a step of a plurality of steps of a surgery the one or more images correspond to;
limit access to a library of augmentation element options during the step of the surgery to only show a subset of augmentation element options of the library of augmentation element options during the step of the surgery, the subset of augmentation element options corresponding to the step of the plurality of steps of the surgery;
automatically identify one or more references in the actual physical scene;
register, during the step of the surgery, the virtual scene to the one or more references to generate an augmented scene comprising one or more augmentation elements configured based on one or more augmentation element options selected from the subset of augmentation element options; and
display, during the surgery, the augmented scene as an overlay on an anatomy of the patient via a display device.

* * * * *